US008619857B2

(12) United States Patent
Zhao et al.

(10) Patent No.: US 8,619,857 B2
(45) Date of Patent: *Dec. 31, 2013

(54) METHODS AND SYSTEMS FOR INTRA PREDICTION

(75) Inventors: Jie Zhao, Camas, WA (US); Christopher A. Segall, Camas, WA (US); Yeping Su, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 267 days.

This patent is subject to a terminal disclaimer.

(21) Appl. No.: 12/757,437

(22) Filed: Apr. 9, 2010

(65) Prior Publication Data

US 2011/0249731 A1 Oct. 13, 2011

(51) Int. Cl.
*H04N 7/26* (2006.01)
*H04N 7/32* (2006.01)

(52) U.S. Cl.
USPC ................................ 375/240.12; 375/E7.243

(58) Field of Classification Search
USPC ....................................... 375/240.12, 240.15
See application file for complete search history.

(56) References Cited

U.S. PATENT DOCUMENTS 7,310,377 B2 12/2007 Wang et al.
8,135,064 B2 3/2012 Tasaka et al.
8,149,910 B2 4/2012 Tanizawa et al.
8,295,351 B2 10/2012 Palfner et al.
8,406,299 B2 3/2013 Karczewicz
2006/0126730 A1 6/2006 Arakawa et al.
2006/0176962 A1 8/2006 Arimura et al.
2006/0222066 A1 10/2006 Yoo et al.
2007/0121731 A1 5/2007 Tanizawa et al.
2008/0056363 A1 3/2008 Lyashevsky et al.
2008/0152005 A1 * 6/2008 Oguz et al. ............... 375/240.12
2008/0159388 A1 7/2008 Kim
2008/0175316 A1 7/2008 Han
2008/0181304 A1 7/2008 Sekiguchi et al.
2008/0240238 A1 10/2008 Yoshino et al.
2008/0240253 A1 10/2008 Au et al.
2008/0240254 A1 10/2008 Au et al.
2008/0304759 A1 12/2008 Lee et al.

(Continued)

FOREIGN PATENT DOCUMENTS

JP 2009-177352 A 8/2009
WO WO 2008/012918 * 7/2006

OTHER PUBLICATIONS

International Search Report—International Application No. PCT/JP2011/059462—Mailing Date Jul. 19, 2011.

(Continued)

*Primary Examiner* — Gims Philippe
*Assistant Examiner* — Reza Aghevli
(74) *Attorney, Agent, or Firm* — Kristine Elizabeth Matthews; David c. Ripma

(57) ABSTRACT

Aspects of the present invention relate to systems and methods for intra prediction. According to one aspect of the present invention, a macroblock may be partitioned into two, or more, sets of blocks. The pixel values for a block within a first set of blocks may be predicted using reconstructed values from only neighboring macroblocks. The pixel values for a block within another set of blocks may be subsequently predicted using reconstructed values from blocks in previously reconstructed sets of blocks and/or reconstructed values from neighboring macroblocks. The pixel values for blocks within a set of blocks may be predicted in parallel.

27 Claims, 15 Drawing Sheets

(56) References Cited

U.S. PATENT DOCUMENTS

| | | | |
|---|---|---|---|
| 2008/0310507 | A1 | 12/2008 | Ye et al. |
| 2009/0034854 | A1 | 2/2009 | Lee et al. |
| 2009/0034857 | A1 | 2/2009 | Moriya et al. |
| 2009/0122864 | A1 | 5/2009 | Palfner et al. |
| 2009/0196342 | A1 | 8/2009 | Divorra Escoda et al. |
| 2009/0225834 | A1 | 9/2009 | Song et al. |
| 2009/0232211 | A1 | 9/2009 | Chen et al. |
| 2009/0268810 | A1 | 10/2009 | Dai |
| 2009/0310677 | A1 | 12/2009 | Shiodera et al. |
| 2010/0118943 | A1 | 5/2010 | Shiodera et al. |

OTHER PUBLICATIONS

International Search Report—International Application No. PCT/JP2011/059454—Mailing Date Jul. 19, 2011.

International Search Report—International Application No. PCT/JP2011/059461—Mailing Date Jul. 19, 2011.

International Search Report—International Application No. PCT/JP2011/059463—Mailing Date Jul. 19, 2011.

International Search Report—International Application No. PCT/JP2011/059460—Mailing Date Jul. 19, 2011.

International Search Report—International Application No. PCT/JP2011/059465—Mailing Date Jul. 19, 2011.

USPTO Office Action—U.S. Appl. No. 12/757,493—Notification Date Mar. 16, 2012.

USPTO Office Action—U.S. Appl. No. 12/757,541—Notification Date Apr. 24, 2012.

Lee et al., "Adaptive Scanning for H.1264/AVC Intra Coding," ETRI Journal, vol. 28, No. 5, Oct. 2006, pp. 668-671.

USPTO Office Action—U.S. Appl. No. 12/757,579—Notification Date May 21, 2012.

USPTO Office Action—U.S. Appl. No. 12/757,602—Notification Date Apr. 18, 2012.

P. N. Tudor, "MPEG-2 Video Compression," Electronics & Communication Engineering Journal, Dec. 1995.

USPTO Office Action—U.S. Appl. No. 12/757,645—Notification Date Apr. 3, 2012.

P. N. Tudor, "MPEG-2 Video Compression, " Electronics & Communication Engineering Journal, Dec. 1995, vol. 7, No. 6.

USPTO Office Action—U.S. Appl. No. 12/757,645—Mailing Date Apr. 3, 2012.

USPTO Office Action—U.S. Appl. No. 12/757,493—Mailing Date Mar. 16, 2012.

Wei and Yang, "Adaptive mode-dependent scan for H264/AVC intracoding," Journal of Electronic Imaging, vol. 19(3), Jul.-Sep. 2010, pp. 033008-1 through 033008-12.

USPTO Office Action—U.S. Appl. No. 12/757,493—Notification Date May 21, 2013.

USPTO Office Action—U.S. Appl. No. 12/757,579—Notification Date Jul. 3, 2013.

USPTO Office Action—U.S. Appl. No. 12/757,602—Notification Date Jun. 17, 2013.

* cited by examiner

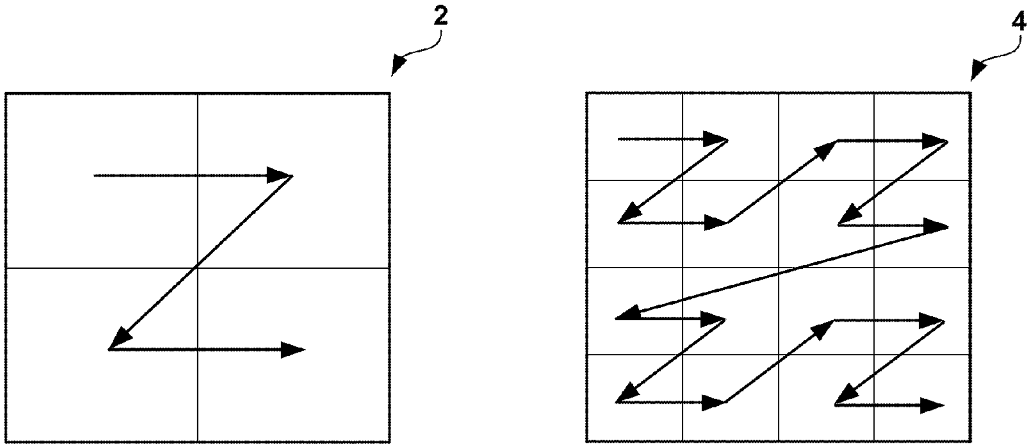
FIG. 1 – Prior Art
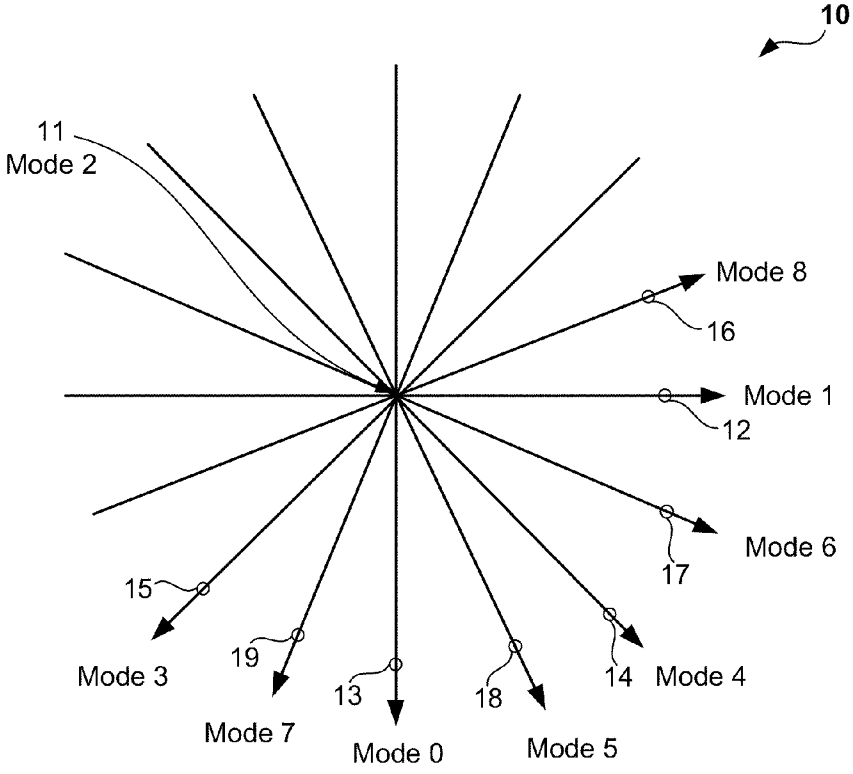
FIG. 2 – Prior Art

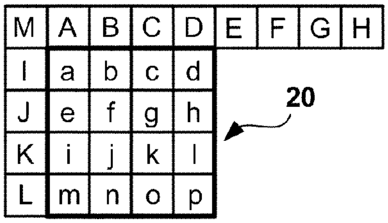
FIG. 3A – Prior Art
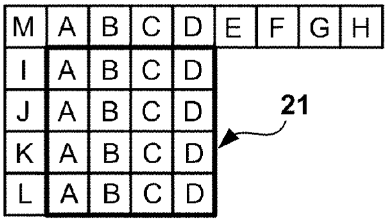
FIG. 3B – Prior Art
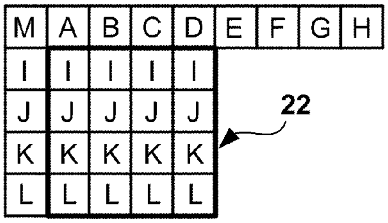
FIG. 3C – Prior Art
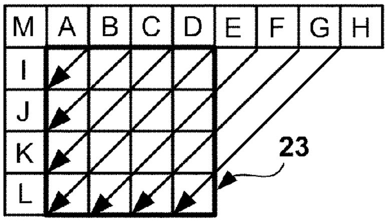
FIG. 3D – Prior Art
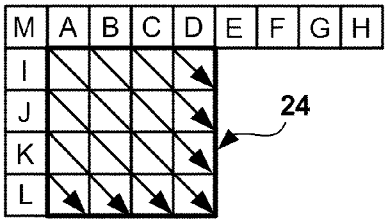
FIG. 3E – Prior Art
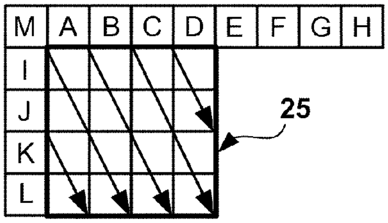
FIG. 3F – Prior Art
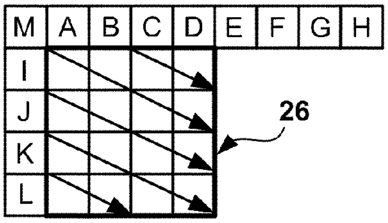
FIG. 3G – Prior Art
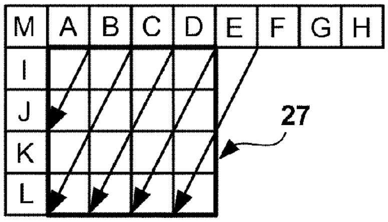
FIG. 3H – Prior Art
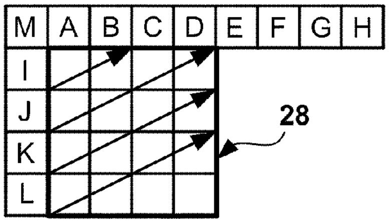
FIG. 3I – Prior Art

| X 397 | A 381 | B 382 | C 383 | D 384 | E 398 | F 401 | G 402 | H 403 |
|---|---|---|---|---|---|---|---|---|
| I 393 | p(0,0) 361 | p(1,0) 362 | p(2,0) 363 | p(3,0) 364 | II 389 | | | |
| J 394 | p(0,1) 365 | p(1,1) 366 | p(2,1) 367 | p(3,1) 368 | JJ 390 | | | |
| K 395 | p(0,2) 369 | p(1,2) 370 | p(2,2) 371 | p(3,2) 372 | KK 391 | | | |
| L 396 | p(0,3) 373 | p(1,3) 374 | p(2,3) 375 | p(3,3) 376 | LL 392 | | | |
| X2 399 | AA 385 | BB 386 | CC 387 | DD 388 | X3 400 | | | |

360

| X | A | B | C | D | E |
|---|---|---|---|---|---|
| I 470 | p(0,0) 451 | p(1,0) 452 | p(2,0) 453 | p(3,0) 454 | II |
| J 471 | p(0,1) 455 | p(1,1) 456 | p(2,1) 457 | p(3,1) 458 | JJ |
| K 472 | p(0,2) 459 | p(1,2) 460 | p(2,2) 461 | p(3,2) 462 | KK |
| L 473 | p(0,3) 463 | p(1,3) 464 | p(2,3) 465 | p(3,3) 466 | LL |
| X2 474 | AA 475 | BB 476 | CC 477 | DD 478 | X3 |

| X2 500 | L 501 | K 502 | J 503 | I 504 | X |
|---|---|---|---|---|---|
| AA 505 | p(0,3) 481 | p(0,2) 482 | p(0,1) 483 | p(0,0) 484 | A |
| BB 506 | p(1,3) 485 | p(1,2) 486 | p(1,1) 487 | p(1,0) 488 | B |
| CC 507 | p(2,3) 489 | p(2,2) 490 | p(2,1) 491 | p(2,0) 492 | C |
| DD 508 | p(3,3) 493 | p(3,2) 494 | p(3,1) 495 | p(3,0) 496 | D |
| X3 | LL | KK | JJ | II | E |

| | X | A | B | C | D | E | | | |
|---|---|---|---|---|---|---|---|---|---|
| I | | p(0,0) 591 | p(1,0) 592 | p(2,0) 593 | p(3,0) 594 | II 618 | | | |
| J | | p(0,1) 595 | p(1,1) 596 | p(2,1) 597 | p(3,1) 598 | JJ 617 | | | |
| K | | p(0,2) 599 | p(1,2) 600 | p(2,2) 601 | p(3,2) 602 | KK 616 | | | |
| L | | p(0,3) 603 | p(1,3) 604 | p(2,3) 605 | p(3,3) 606 | LL 615 | | | |
| X2 | | AA 610 | BB 611 | CC 612 | DD 613 | X3 614 | | | |

| | X3 640 | DD 641 | CC 642 | BB 643 | AA 644 | X2 | | | |
|---|---|---|---|---|---|---|---|---|---|
| LL 645 | | p(3,3) 621 | p(2,3) 622 | p(1,3) 623 | p(0,3) 624 | L | | | |
| KK 646 | | p(3,2) 625 | p(2,2) 626 | p(1,2) 627 | p(0,2) 628 | K | | | |
| JJ 647 | | p(3,1) 629 | p(2,1) 630 | p(1,1) 631 | p(0,1) 632 | J | | | |
| II 648 | | p(3,0) 633 | p(2,0) 634 | p(1,0) 635 | p(0,0) 636 | I | | | |
| | E | D | C | B | A | X | | | |

| X | A | B | C | D | E | | | |
|---|---|---|---|---|---|---|---|---|
| I | p(0,0) 661 | p(1,0) 662 | p(2,0) 663 | p(3,0) 664 | II 688 | | | |
| J | p(0,1) 665 | p(1,1) 666 | p(2,1) 667 | p(3,1) 668 | JJ 687 | | | |
| K | p(0,2) 669 | p(1,2) 670 | p(2,2) 671 | p(3,2) 672 | KK 686 | | | |
| L | p(0,3) 673 | p(1,3) 674 | p(2,3) 675 | p(3,3) 676 | LL 685 | | | |
| X2 | AA 680 | BB 681 | CC 682 | DD 683 | X3 684 | | | |

| X3 710 | DD 711 | CC 712 | BB 713 | AA 714 | X2 | | | |
|---|---|---|---|---|---|---|---|---|
| LL 715 | p(3,3) 691 | p(2,3) 692 | p(1,3) 693 | p(0,3) 694 | L | | | |
| KK 716 | p(3,2) 695 | p(2,2) 696 | p(1,2) 697 | p(0,2) 698 | K | | | |
| JJ 717 | p(3,1) 699 | p(2,1) 700 | p(1,1) 701 | p(0,1) 702 | J | | | |
| II 718 | p(3,0) 703 | p(2,0) 704 | p(1,0) 705 | p(0,0) 706 | I | | | |
| | E | D | C | B | A | X | | |

| X | A | B | C | D | E | | | |
|---|---|---|---|---|---|---|---|---|
| I | p(0,0) 731 | p(1,0) 732 | p(2,0) 733 | p(3,0) 734 | II | | | |
| J 750 | p(0,1) 735 | p(1,1) 736 | p(2,1) 737 | p(3,1) 738 | JJ | | | |
| K 751 | p(0,2) 739 | p(1,2) 740 | p(2,2) 741 | p(3,2) 742 | KK | | | |
| L 752 | p(0,3) 743 | p(1,3) 744 | p(2,3) 745 | p(3,3) 746 | LL | | | |
| X2 753 | AA 754 | BB 755 | CC 756 | DD 757 | X3 | | | |

730
758

| X2 790 | L 791 | K 792 | J 793 | I | X | | | |
|---|---|---|---|---|---|---|---|---|
| AA 794 | p(0,3) 761 | p(0,2) 762 | p(0,1) 763 | p(0,0) 764 | A | | | |
| BB 795 | p(1,3) 765 | p(1,2) 766 | p(1,1) 767 | p(1,0) 768 | B | | | |
| CC 796 | p(2,3) 769 | p(2,2) 770 | p(2,1) 771 | p(2,0) 772 | C | | | |
| DD 797 | p(3,3) 773 | p(3,2) 774 | p(3,1) 775 | p(3,0) 776 | D | | | |
| X3 | LL | KK | JJ | II | E | | | |

760
798

| X | A | B 830 | C 831 | D 832 | E 833 |
|---|---|---|---|---|---|
| I | p(0,0) 811 | p(1,0) 812 | p(2,0) 813 | p(3,0) 814 | II 834 |
| J | p(0,1) 815 | p(1,1) 816 | p(2,1) 817 | p(3,1) 818 | JJ 835 |
| K | p(0,2) 819 | p(1,2) 820 | p(2,2) 821 | p(3,2) 822 | KK 836 |
| L | p(0,3) 823 | p(1,3) 824 | p(2,3) 825 | p(3,3) 826 | LL 837 |
| X2 | AA | BB | CC | DD | X3 |

| E 860 | D 861 | C 862 | B 863 | A | X |
|---|---|---|---|---|---|
| II 864 | p(3,0) 841 | p(2,0) 842 | p(1,0) 843 | p(0,0) 844 | I |
| JJ 865 | p(3,1) 845 | p(2,1) 846 | p(1,1) 847 | p(0,1) 848 | J |
| KK 866 | p(3,2) 849 | p(2,2) 850 | p(1,2) 851 | p(0,2) 852 | K |
| LL 867 | p(3,3) 853 | p(2,3) 854 | p(1,3) 855 | p(0,3) 856 | L |
| X3 | DD | CC | BB | AA | X2 |

| X 940 | A 921 | B 922 | C 923 | D 924 | E 941 | | | |
|---|---|---|---|---|---|---|---|---|
| I 925 | p(0,0) 901 | p(1,0) 902 | p(2,0) 903 | p(3,0) 904 | II 935 | | | |
| J 926 | p(0,1) 905 | p(1,1) 906 | p(2,1) 907 | p(3,1) 908 | JJ 936 | 950 | | |
| K 927 | p(0,2) 909 | p(1,2) 910 | p(2,2) 911 | p(3,2) 912 | KK 937 | 951 | 955 | |
| L 928 | p(0,3) 913 | p(1,3) 914 | p(2,3) 915 | p(3,3) 916 | LL 938 | 952 | 956 | |
| X2 942 | AA 931 | BB 932 | CC 933 | DD 934 | X3 943 | 953 | 957 | |

900

METHODS AND SYSTEMS FOR INTRA PREDICTION

FIELD OF THE INVENTION

Embodiments of the present invention relate generally to encoding and decoding of video data and, in particular, to methods and systems for intra prediction.

BACKGROUND

State-of-the-art video-coding standards, for example, H.264/AVC and other video-coding standards, may provide higher coding efficiency at the expense of higher computational complexity, which may result in slower encoding and/or decoding speeds. Additionally, computational complexity may increase with increasing quality and resolution requirements. Parallel decoding and parallel encoding may improve decoding and encoding speeds, respectively. Additionally, parallel decoding and parallel encoding may reduce memory bandwidth requirements for decoding and encoding processes, respectively. Furthermore, with advances in multi-core processors, parallel decoding and parallel encoding may be desirable in order to fully use the power of a multi-core processor.

SUMMARY

Some embodiments of the present invention comprise methods and systems for intra prediction.

According to a first aspect of the present invention, a macroblock may be partitioned into two, or more, sets of blocks. A set of blocks may be referred to as a plurality of blocks or a group of blocks. The sets of blocks may be referred to as a partition of the macroblock.

According to a second aspect of the present invention, for a block in a first set of blocks, pixel values may be predicted using reconstructed pixel values from only one or more neighboring macroblocks. The pixel values within a block in another set of blocks may be subsequently predicted using reconstructed pixel values from blocks in previously reconstructed sets of blocks, in the partition of the macroblock, and/or reconstructed pixel values in neighboring macroblocks.

According to a third aspect of the present invention, the blocks within a set of blocks, in the partition of the macroblock, may be encoded in parallel.

According to a fourth aspect of the present invention, the blocks within a set of blocks, in the partition of the macroblock, may be decoded in parallel.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1 is a picture depicting the processing order for intra 8×8 prediction and intra 4×4 prediction for H.264/AVC and other coding standards (PRIOR ART);

FIG. 2 is a picture depicting the nine intra-prediction-mode directions of H.264/AVC intra 4×4 prediction and intra 8×8 prediction (PRIOR ART);

FIG. 3A is a picture depicting an exemplary block with neighboring reconstructed samples (PRIOR ART);

FIG. 3B is a picture depicting reconstructed pixel values associated with a vertical intra-prediction mode (PRIOR ART);

FIG. 3C is a picture depicting reconstructed pixel values associated with a horizontal intra-prediction mode (PRIOR ART);

FIG. 3D is a picture depicting an intra-prediction-mode direction associated with a diagonal down left intra-prediction mode (PRIOR ART);

FIG. 3E is a picture depicting an intra-prediction-mode direction associated with a diagonal down right intra-prediction mode (PRIOR ART);

FIG. 3F is a picture depicting an intra-prediction-mode direction associated with a vertical right intra-prediction mode (PRIOR ART);

FIG. 3G is a picture depicting an intra-prediction-mode direction associated with a horizontal down intra-prediction mode (PRIOR ART);

FIG. 3H is a picture depicting an intra-prediction-mode direction associated with a vertical left intra-prediction mode (PRIOR ART);

FIG. 3I is a picture depicting an intra-prediction-mode direction associated with a horizontal up intra-prediction mode (PRIOR ART);

Figure 18A:
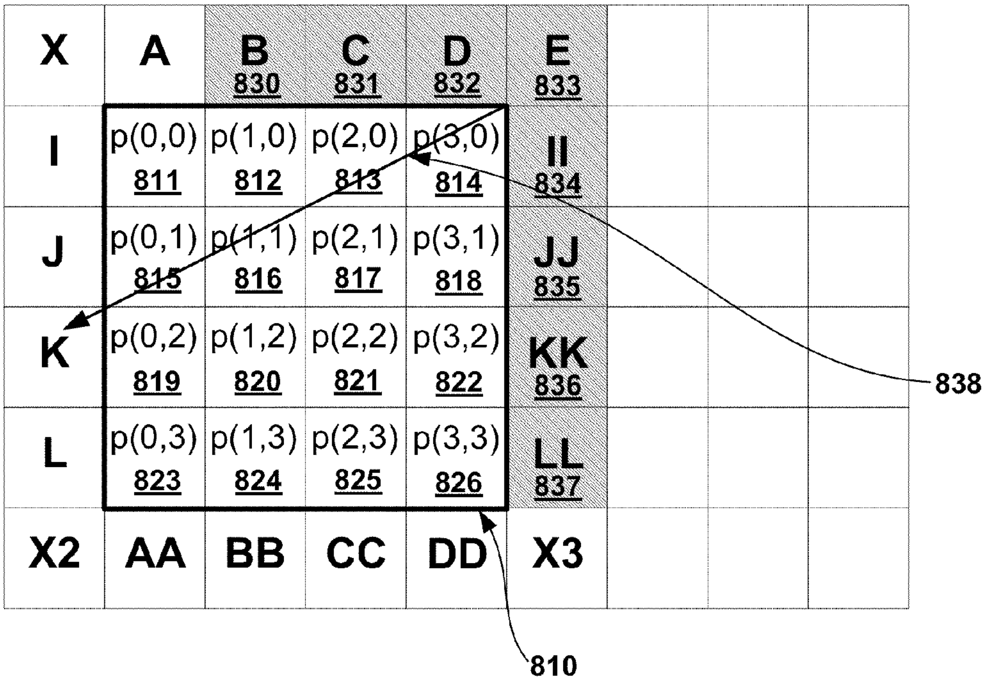
FIG. 18A is a picture depicting an intra-prediction-mode direction, according to embodiments of the present invention, in a direction opposite to a horizontal up intra-prediction-mode direction.
Figure 18B:
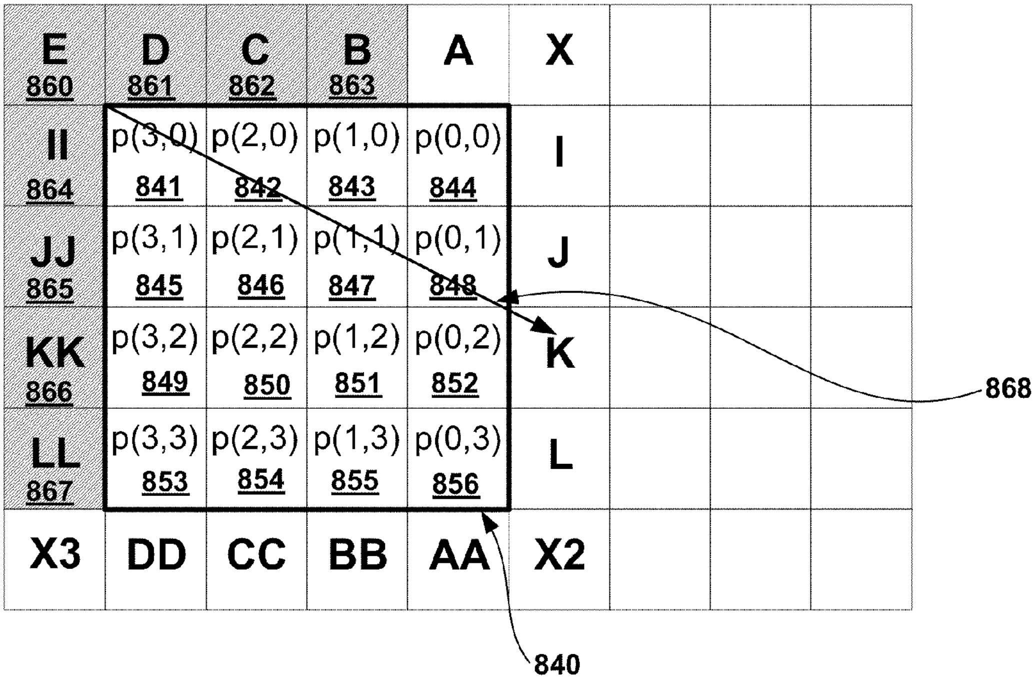
Figure 19:
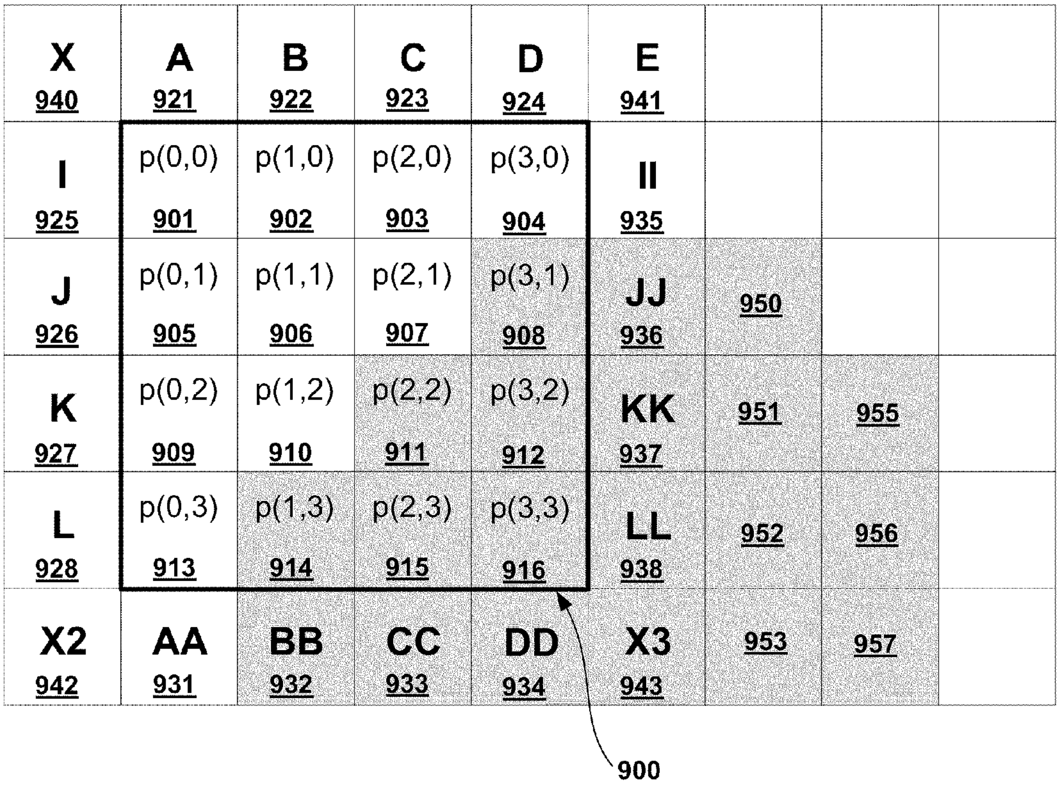

FIG. 18B is a picture depicting intra prediction, according to embodiments of the present invention, in an intra-prediction-mode direction opposite to a horizontal up intra-prediction-mode direction through flipping and use of the "mode 6" prediction equations; and FIG. 19 is a picture depicting an exemplary block in which predicting block pixel values using an opposite-direction prediction mode may be advantageous.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

State-of-the-art video-coding standards, for example, H.264/AVC and other video-coding standards, may provide higher coding efficiency at the expense of higher computational complexity, which may result in slower encoding and/or decoding speeds. Additionally, computational complexity may increase with increasing quality and resolution requirements. Parallel decoding and parallel encoding may improve decoding and encoding speeds, respectively. Additionally, parallel decoding and parallel encoding may reduce memory bandwidth requirements for decoding and encoding processes, respectively. Furthermore, with advances in multi-core processors, parallel decoding and parallel encoding may be desirable in order to fully use the power of a multi-core processor.

Intra prediction may be an important contributing factor in video-coding inefficiency. Many state-of-the-art video codecs (coder/decoders) use intra prediction to reduce spatial redundancy. In the encoder and the decoder, intra prediction may use reconstructed neighboring blocks to predict a current block. Thus, the encoder need signal only the prediction mode and the prediction residual. However, the dependency on reconstructed neighboring blocks prevents intra prediction from being parallelized. The serial dependency may be more problematic for the intra-prediction modes of smaller block sizes. Many video codecs organize blocks of pixels into larger blocks referred to as macroblocks. For example, if a 16×16 macroblock uses intra 8×8 prediction, then the four 8×8 blocks which make up the macroblock must be processed sequentially. However, if a 16×16 macroblock uses intra 4×4 prediction, then the sixteen 4×4 blocks must be processed sequentially. The serial design of current intra-prediction schemes may result in unbalanced loads when processing macroblocks associated with different prediction modes, for example, intra 4×4 decoding, intra 8×8 decoding and intra 16×16 may take different decoding cycles. Further, if all macroblocks are intra 4×4 coded, all blocks must be processed sequentially.

Some embodiments of the present invention comprise methods and systems for intra prediction that allow parallel implementation with negligible impact on coding efficiency.

Some embodiments of the present invention may be described herein in relation to luminance-channel signals. This is for purposes of illustration and not limitation. As readily appreciated by a person having ordinary skill in the art, embodiments of the present invention, described herein in relation to luminance-channel signals, may be used in conjunction with chrominance-channel, disparity-channel and other signal sources.

Embodiments of the present invention may relate to a video device. Exemplary video devices may include a video encoder, a video decoder, a video transcoder and other video devices.

Some embodiments of the present invention may be described in relation to H.264/AVC. The following section provides a brief introduction to intra prediction in H.264/AVC.

Introduction to Intra Prediction in H.264/AVC

Intra prediction exploits spatial relationships within a frame, or an image. At an encoder, a current block may be predicted from neighboring previously encoded blocks, also considered reconstructed blocks, located above and/or to the left of the current block, and the prediction mode and the prediction residual may be coded for the block. At a decoder, a current block may be predicted, according to a prediction mode, from neighboring reconstructed blocks located above and/or to the left of the current block, and the decoded prediction residual for the block may be added to the prediction to obtain the block signal values. There are three types of intra luma prediction, for example, defined in H.264/AVC: intra 4×4, intra 8×8 and intra 16×16 prediction. Larger block sizes also may be desirable.

In a 16×16 macroblock, there are four 8×8 blocks or sixteen 4×4 blocks. FIG. 1 depicts the processing order for intra 8×8 2 prediction and intra 4×4 4 prediction for H.264/AVC, and other coding standards. This processing order may be referred to as a zig-zag processing order. In these standards, a current block may be predicted using previously reconstructed neighboring blocks. Thus, the processing of previous blocks in the scan order must be completed before a current block may be processed. Intra 4×4 prediction has more serial dependency compared to intra 8×8 and 16×16 prediction. This serial dependency may cause an increase of operating cycles, a slowdown of intra prediction, an uneven throughput of different intra-prediction types and other undesirable processing characteristics.

In H.264/AVC, intra 4×4 prediction and intra 8×8 prediction have nine prediction modes 10 as shown in FIG. 2. Pixel values in a current block may be predicted from pixel values in a reconstructed upper and/or left neighboring block(s) relative to the current block. The direction of the arrow depicting a mode indicates the prediction direction for the mode. In FIG. 2, the center point 11 does not represent a direction so this point may be associated with a DC prediction mode, also referred to as "mode 2." A horizontal arrow 12 extending to the right from the center point 11 may represent a horizontal prediction mode, also referred to as "mode 1." A vertical arrow 13 extending down from the center point 11 may represent a vertical prediction mode, also referred to as "mode 0." An arrow 14 extending from the center point 11 diagonally downward to the right at approximately a 45 degree angle from horizontal may represent a diagonal down-right (DDR) prediction mode, also referred to as "mode 4." An arrow 15 extending from the center point 11 diagonally downward to the left at approximately a 45 degree angle from horizontal may represent a diagonal down-left (DDL) prediction mode, also referred to as "mode 3." Both the DDR and DDL prediction modes may be referred to as diagonal prediction modes. An arrow 16 extending from the center point 11 diagonally upward to the right at approximately a 22.5 degree angle from horizontal may represent a horizontal up (HU) prediction mode, also referred to as "mode 8." An arrow 17 extending from the center point 11 diagonally downward to the right at approximately a 22.5 degree angle from horizontal may represent a horizontal down (HD) prediction mode, also referred to as "mode 6." An arrow 18 extending from the center point 11 diagonally downward to the right at approximately a 67.5 degree angle from horizontal may represent a vertical right (VR) prediction mode, also referred to as "mode 5." An arrow 19 extending from the center point 11 diagonally downward to the left at approximately a 67.5 degree angle from horizontal may represent a vertical left (VL) prediction mode, also referred to as "mode 7." The HU, HD, VR and VL prediction modes may be referred to collectively as intermediate-angle prediction modes.

FIG. 3A shows an exemplary 4×4 block 20 of samples, labeled a-p, that may be predicted from reconstructed, neighboring samples, labeled A-M. When samples E-H are not available, in some implementations of the standard, the unavailable samples may be replaced by sample D. In alternative implementations, unavailable samples may be replaced with a fixed, default value, which may be related to the bit depth of the data. For example, for 8-bit data, the default value may be 128, for 10-bit data, the default value may be 512 and, in general, the default value may be $2^{b-1}$ where b is the bit depth of the image data. Alternative implementations may use other values, as defined by the specification of the standard, to replace unavailable samples.

Intra-prediction mode 0 (prediction-mode direction indicated as 13 in FIG. 2) may be referred to as vertical-mode intra prediction. In mode 0, or vertical-mode intra prediction, the samples of a current block may be predicted in the vertical direction from the reconstructed samples in the block above the current block. FIG. 3B illustrates an exemplary vertical-mode intra prediction 21 of the samples in a 4×4 block. In FIG. 3B, the samples labeled a-p in FIG. 3A are shown replaced with the label of the sample label from FIG. 3A from which they are predicted.

Intra-prediction mode 1 (prediction-mode direction indicated as 12 in FIG. 2) may be referred to as horizontal-mode intra prediction. In mode 1, or horizontal-mode intra prediction, the samples of a block may be predicted in the horizontal direction from the reconstructed samples in the block to the left of the current block. FIG. 3C illustrates an exemplary horizontal prediction 22 of the samples in a 4×4 block. In FIG. 3C, the samples labeled a-p in FIG. 3A are shown replaced with the label of the sample label from FIG. 3A from which they are predicted.

Intra-prediction mode 3 (prediction-mode direction indicated as 15 in FIG. 2) may be referred to as diagonal-down-left-mode intra prediction. In mode 3, the samples of a block 23 may be predicted from neighboring blocks in the direction shown in FIG. 3D.

Intra-prediction mode 4 (prediction-mode direction indicated as 14 in FIG. 2) may be referred to as diagonal-down-right-mode intra prediction. In mode 4, the samples of a block 24 may be predicted from neighboring blocks in the direction shown in FIG. 3E.

Intra-prediction mode 5 (prediction-mode direction indicated as 18 in FIG. 2) may be referred to as vertical-right-mode intra prediction. In mode 5, the samples of a block 25 may be predicted from neighboring blocks in the direction shown in FIG. 3F.

Intra-prediction mode 6 (prediction-mode direction indicated as 17 in FIG. 2) may be referred to as horizontal-down-mode intra prediction. In mode 6, the samples of a block 26 may be predicted from neighboring blocks in the direction shown in FIG. 3G.

Intra-prediction mode 7 (prediction-mode direction indicated as 19 in FIG. 2) may be referred to as vertical-left-mode intra prediction. In mode 7, the samples of a block 27 may be predicted from neighboring blocks in the direction shown in FIG. 3H.

Intra-prediction mode 8 (prediction-mode direction indicated as 16 in FIG. 2) may be referred to as horizontal-up-mode intra prediction. In mode 8, the samples of a block 28 may be predicted from neighboring blocks in the direction shown in FIG. 3I.

In intra-prediction mode 2, which may be referred to as DC mode, all samples labeled a-p in FIG. 3A may be replaced with the average of samples labeled A-D and I-L in FIG. 3A.

The nine intra-prediction modes described above correspond to the nine intra-prediction modes for luminance samples in the 4×4 sub-blocks of a 16×16 macroblock in H.264/AVC.

H.264/AVC also supports four 16×16 luma intra prediction modes in which the 16×16 samples of the macroblock are extrapolated from the upper and/or left-hand encoded and reconstructed samples adjacent to the macroblock. The samples may be extrapolated vertically, mode 0 (similar to mode 0 for the 4×4 size block), or the samples may be extrapolated horizontally, mode 1 (similar to mode 1 for the 4×4 size block). The samples may be replaced by the mean, mode 2 (similar to the DC mode for the 4×4 size block), or a mode 3, referred to as plane mode, may be used in which a linear plane function is fitted to the upper and left-hand samples. This concludes the brief introduction to H.264/AVC intra prediction.

In some embodiments of the present invention, the blocks within a macroblock may be partitioned into a first plurality of blocks, also considered a first group of blocks or a first set of blocks, and a second plurality of blocks, also considered a second group of blocks or a second set of blocks, in order to break the serial dependency, among blocks, of intra prediction. A block may be an m×n size block of pixels. In some of these embodiments, the blocks within the first plurality of blocks may be encoded using reconstructed pixel values from only one or more previously encoded neighboring macroblocks, and then the blocks within the second plurality of blocks may be encoded using the reconstructed pixel values from previously encoded blocks associated with the first plurality of blocks and/or neighboring macroblocks.

Correspondingly, in some embodiments of the present invention, the blocks within the first plurality of blocks may be decoded using reconstructed pixel values from only neighboring macroblocks, and then the blocks within the second plurality of blocks may be decoded using the reconstructed pixel values from reconstructed blocks associated with the first plurality of blocks and/or neighboring macroblocks.

Blocks within the first plurality of blocks may be encoded, fully or partially, in parallel, and blocks within the second plurality of blocks may be encoded, fully or partially, in parallel. Blocks within the first plurality of blocks may be decoded, fully or partially, in parallel, and blocks within the second plurality of blocks may be decoded, fully or partially, in parallel.

In some embodiments of the present invention, all of the blocks within a macroblock may be encoded using reconstructed pixel values from only one or more previously encoded neighboring macroblocks. Thus, the blocks within the macroblock may be encoded, fully or partially, in parallel.

Correspondingly, in some embodiments of the present invention, all of the blocks within a macroblock may be decoded using reconstructed pixel values from only one or more neighboring macroblocks. Thus, the blocks within the macroblock may be decoded, fully or partially, in parallel.

For a macroblock with N blocks, the degree of parallelism may be N/2. For example, the speed up for 4×4 intra prediction for a 16×16 macroblock may be close to a factor of eight.

Figure 4:
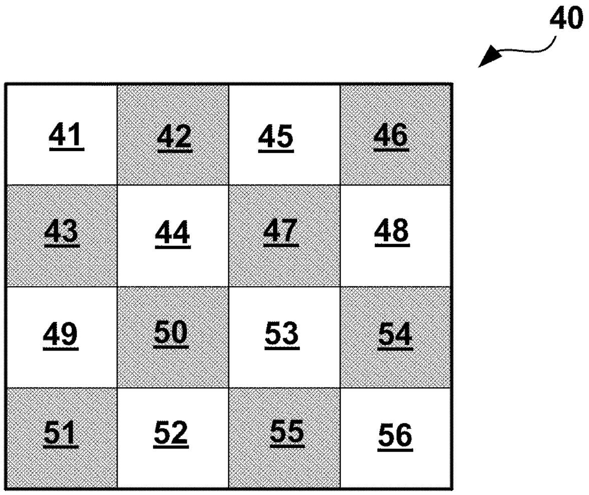
FIG. 4 is a picture depicting an exemplary partitioning of a macroblock into two sets of blocks according to embodiments of the present invention.
Figure 5A:
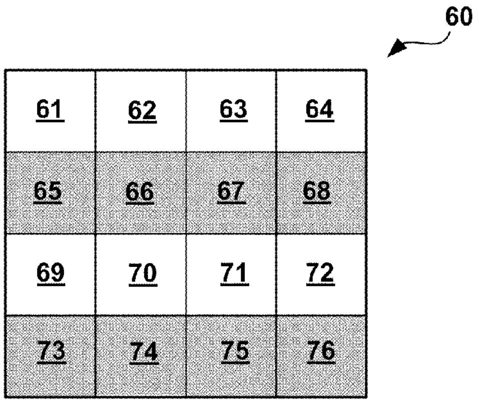
FIG. 5A is a picture depicting an exemplary partitioning of a macroblock into two sets of blocks according to embodiments of the present invention.
Figure 5B:
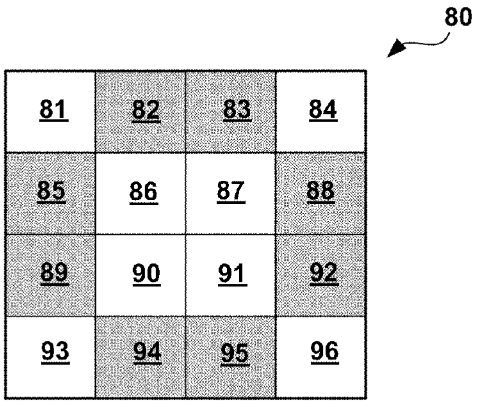
FIG. 5B is a picture depicting an exemplary partitioning of a macroblock into two sets of blocks according to embodiments of the present invention.
Figure 5C:
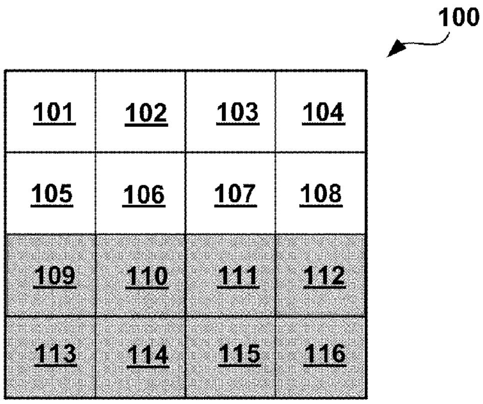
FIG. 5C is a picture depicting an exemplary partitioning of a macroblock into two sets of blocks according to embodiments of the present invention.
Figure 5D:
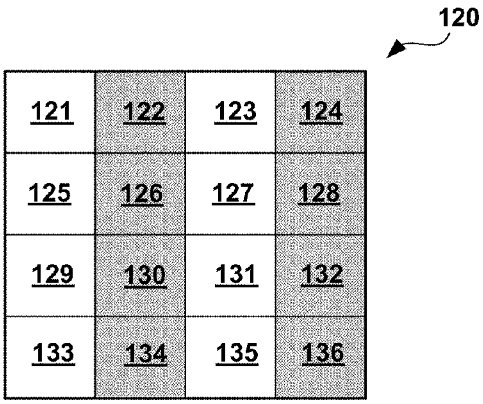
FIG. 5D is a picture depicting an exemplary partitioning of a macroblock into two sets of blocks according to embodiments of the present invention.

One exemplary partition 40, for $$\frac{M}{4}\times\frac{N}{4}$$

intra prediction of an M×N macroblock, is shown in FIG. 4. In some embodiments, M and N may be equal. In other embodiments, M and N may be unequal. In this exemplary partition, the sixteen blocks 41-56 may be grouped into two sets of eight blocks each according to a checker-board pattern. The eight blocks in one set are shown in white 41, 44, 45, 48, 49, 52, 53, 56, and the eight blocks in the other set are shown in cross-hatch 42, 43, 46, 47, 50, 51, 54, 55. One set of blocks may be decoded, or encoded, in parallel first using previously reconstructed macroblocks, and then the second set of blocks may be decoded, or encoded, in parallel using the reconstructed blocks associated with the first set and/or previously reconstructed macroblocks. Either set may be the first set in the processing order. In some embodiments, the first set to be processed may be predefined, which may not require bitstream signaling. In alternative embodiments, the choice of which set to process first may be signaled in the bitstream.

Bitstream signaling may refer to signaling information in a bitstream or signaling information in a stored memory.

Alternative exemplary partitions 60, 80, 100, 120 are shown in FIGS. 5A-5D. In the exemplary partition 60 shown in FIG. 5A, the blocks 61-76 within a macroblock may be grouped into two sets of blocks: one set 61-64, 69-72 shown in white; and another set 65-68, 73-76 shown in cross-hatch. In the exemplary partition 80 shown in FIG. 5B, the blocks 81-96 within a macroblock may be grouped into two sets of blocks: one set 81, 84, 86, 87, 90, 91, 93, 96 shown in white; and another set 82, 83, 85, 88, 89, 92, 94, 95 shown in cross-hatch. In the exemplary partition 100 shown in FIG. 5C, the blocks 101-116 within a macroblock may be grouped into two sets of blocks: one set 101-108 shown in white; and another set 109-116 shown in cross-hatch. In the exemplary partition 120 shown in FIG. 5D, the blocks 121-136 within a macroblock may be grouped into two sets of blocks: a one set 121, 123, 125, 127, 129, 131, 133, 135 shown in white; and another set 122, 124, 126, 128, 130, 132, 134, 136 shown in cross-hatch. As appreciated by a person of ordinary skill in the art, the exemplary partitions shown in FIG. 4 and FIGS. 5A-5D may be readily extended to other macroblock and block sizes.

In alternative embodiments of the present invention, a macroblock may be partitioned into three pluralities of blocks. In some of these embodiments, a first plurality of blocks may be predicted in the encoding process using reconstructed pixel values from only previously encoded neighboring macroblocks. A second plurality of blocks may be subsequently predicted in the encoding process using reconstructed pixel values from the previously encoded blocks associated with the first plurality of blocks and/or using reconstructed pixel values from previously encoded neighboring macroblocks. Then a third plurality of blocks may be subsequently predicted in the encoding process using reconstructed pixel values from the previously encoded blocks associated with the first plurality of blocks, reconstructed pixel values from the previously encoded blocks associated with the second plurality of blocks and/or reconstructed pixel values from previously encoded neighboring macroblocks. In some embodiments, the blocks within a plurality of blocks may be encoded, fully or partially, in parallel.

Correspondingly, in some embodiments of the present invention, a first plurality of blocks may be predicted in the decoding process using reconstructed pixel values in only neighboring macroblocks. A second plurality of blocks may be subsequently predicted in the decoding process using the reconstructed pixel values in the reconstructed blocks associated with the first plurality of blocks and/or reconstructed pixel values in neighboring macroblocks. Then a third plurality of blocks may be subsequently predicted in the decoding process using reconstructed pixel values from the previously decoded blocks associated with the first plurality of blocks, reconstructed pixel values from the previously decoded blocks associated with the second plurality of blocks and/or reconstructed pixel values from previously decoded neighboring macroblocks. In some embodiments, the blocks with a plurality of blocks may be decoded, fully or partially, in parallel.

Figure 6A:
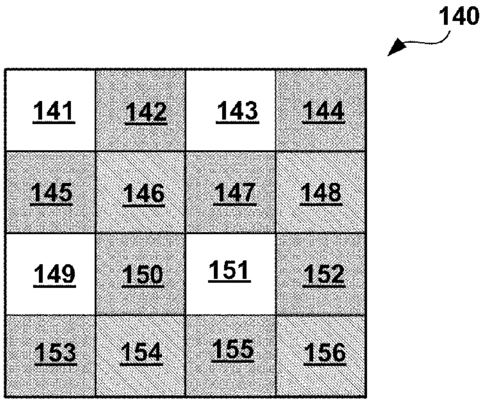
FIG. 6A is a picture depicting an exemplary partitioning of a macroblock into three sets of blocks according to embodiments of the present invention.
Figure 6B:
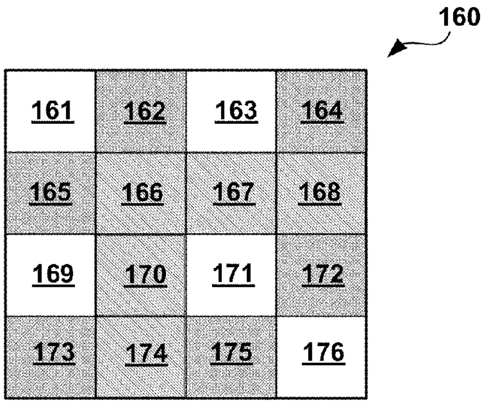
FIG. 6B is a picture depicting an exemplary partitioning of a macroblock into three sets of blocks according to embodiments of the present invention.

FIG. 6A and FIG. 6B depict exemplary three-group partitions 140, 160 of a macroblock. In the exemplary partition 140 shown FIG. 6A, the blocks shown in negative-slope hatching 146, 148, 154, 156 are allocated to a one group of blocks; the blocks shown in white 141, 143, 149, 151 are allocated to another group of blocks; and the blocks shown in cross-hatch 142, 144, 145, 147, 150, 152, 153, 155 are allocated to yet another group of blocks. In the exemplary partition 160 shown FIG. 6B, the blocks shown negative-slope hatching 166, 167, 168, 170, 174 are allocated to one group of blocks; the blocks shown in cross-hatch 162, 164, 165, 172, 173, 175 are allocated to a another group of blocks; and the blocks shown in white 161, 163, 169, 171, 176 are allocated to yet another group of blocks.

In alternative embodiments of the present invention, a macroblock may be partitioned into two or more pluralities of blocks. In some of these embodiments, a first plurality of blocks may be predicted at the encoder using reconstructed pixel values from only previously encoded neighboring macroblocks. A subsequent plurality of blocks may be predicted at the encoder using reconstructed pixel values from previously encoded blocks from previously encoded partitions and/or reconstructed pixel values from previously encoded neighboring macroblocks. Correspondingly, in some embodiments of the present invention, the first plurality of blocks may be predicted at the decoder using reconstructed pixel values from only neighboring macroblocks, and a subsequent plurality of blocks associated with a partition may be predicted at the decoder using reconstructed pixels from previously decoded blocks, from previously decoded partitions and/or previously decoded reconstructed pixel values in neighboring macroblocks. In some embodiments, the blocks with a plurality of blocks may be encoded, fully or partially, in parallel. In some embodiments, the blocks with a plurality of blocks may be decoded, fully or partially, in parallel.

Figure 7:
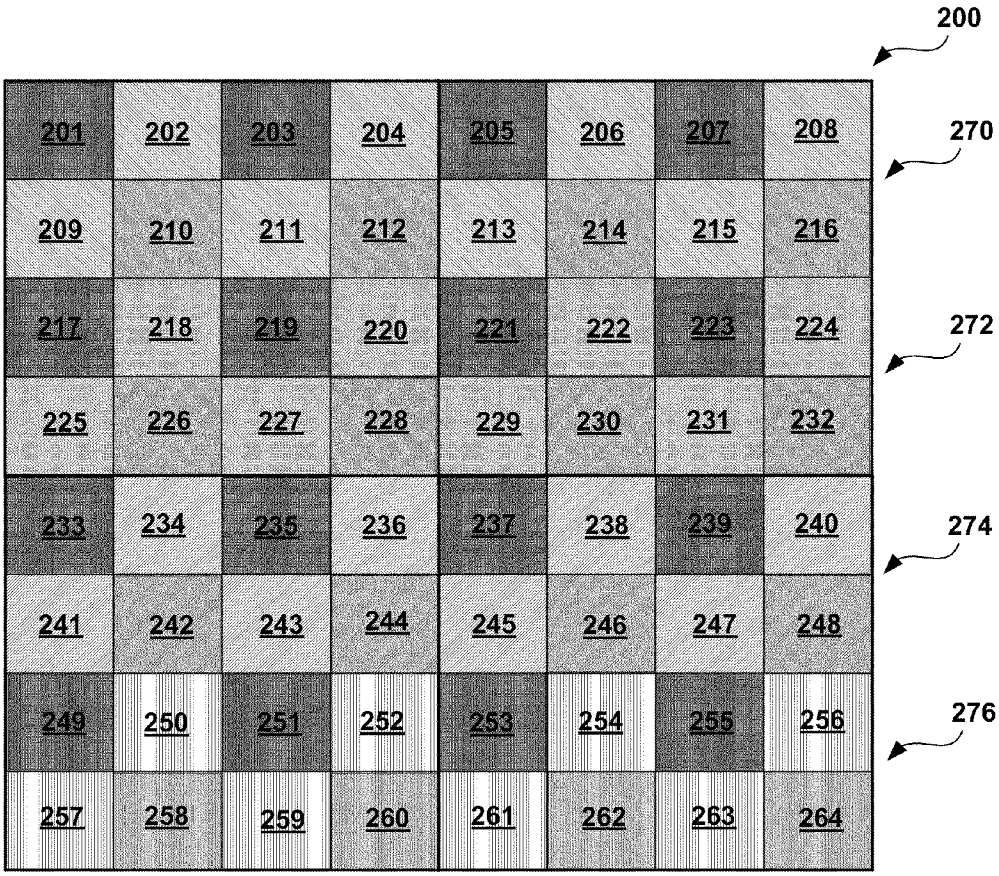
FIG. 7 is a picture depicting an exemplary partition of 4×4 blocks in a 32×32 macroblock according to embodiments of the present invention.

FIG. 7 shows an exemplary partition 200 of 4×4 blocks in a 32×32 macroblock. In this exemplary partition 200, the sixty-four 4×4 blocks 201-264 are partitioned into four 32×8 sub-macroblocks: a first sub-macroblock 270 consisting of sixteen 4×4 blocks 201-216 shown in negative-slope hatching; a second sub-macroblock 272 consisting of sixteen 4×4 blocks 217-232 shown in cross-hatch; a third sub-macroblock 274 consisting of sixteen 4×4 blocks 233-248 shown in positive-slope hatching; and a fourth sub-macroblock 276 consisting of sixteen 4×4 blocks 249-264 shown in vertical-hatch. Each sub-macroblock 270, 272, 274, 276 may be partitioned into three sets of blocks: a first set of blocks shown with light shading (blocks 210, 212, 214, 216 in the first sub-macroblock 270; blocks 226, 228, 230, 232 in the second sub-macroblock 272; blocks 242, 244, 246, 248 in the third sub-macroblock 274; blocks 258, 260, 262, 264 in the fourth sub-macroblock 276); a second set of blocks shown with dark shading (blocks 201, 203, 205, 207 in the first sub-macroblock 270; blocks 217, 219, 221, 223 in the second sub-macroblock 272; blocks 233, 235, 237, 239 in the third sub-macroblock 274; blocks 249, 251, 253, 255 in the fourth sub-macroblock 276); and a third set of blocks shown with no shading (blocks 202, 204, 206, 208, 209, 211, 213, 215 in the first sub-macroblock 270; blocks 218, 220, 222, 224, 225, 227, 229, 231 in the second sub-macroblock 272; blocks 234, 236, 238, 240, 241, 243, 245, 247 in the third sub-macroblock 274; blocks 250, 252, 254, 256, 257, 259, 261, 263 in the fourth sub-macroblock 276).

In some embodiments, the set processing order may be predefined, which may not require bitstream signaling. In alternative embodiments, the choice of processing order may be signaled in the bitstream.

In some embodiments of the present invention, sub-macroblocks may be processed, fully or partially, in parallel. In some embodiments, at the encoder, the first plurality of blocks in each sub-macroblock may be predicted from pixel values in only previously encoded neighboring macroblocks. Subsequent groups of blocks may be predicted from pixel values in previously encoded groups of blocks and/or pixel values in previously encoded neighboring macroblocks. In some embodiments, at the decoder, the first plurality of blocks in each sub-macroblocks may be decoded using pixel values from only previously reconstructed neighboring macroblocks. Subsequent groups of blocks may be reconstructed from pixel values in previously reconstructed groups of blocks and/or pixel values in previously reconstructed neighboring macroblocks.

Figure 8:
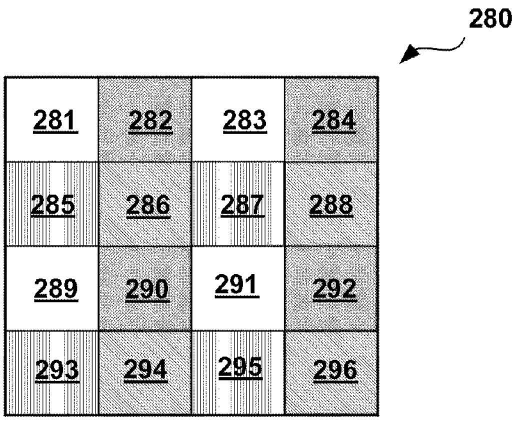
FIG. 8 is a picture depicting an exemplary partitioning of a macroblock into four sets of blocks according to embodiments of the present invention.

One exemplary partition 280, for $$\frac{M}{4}\times\frac{N}{4}$$

intra prediction of an M×N macroblock, is shown in FIG. 8. In some embodiments, M and N may be equal. In other embodiments, M and N may be unequal. In this exemplary partition, the sixteen blocks 281-296 of the macroblock may be grouped into four sets of four blocks each according to an alternating row, alternating pattern. The four blocks: in one set are shown in white 281, 283, 289, 291; in a second set are shown in cross-hatch 282, 284, 290, 292; in a third set are shown in negative-slope cross-hatch 286, 288, 294, 296; and in a fourth set are shown in vertical hatching 285, 287, 293, 295. One set of blocks may be decoded first, followed by a second set of blocks, then a third set and finishing with a fourth set. In some embodiments, the blocks within a set of blocks may be decoded, fully or partially, in parallel. In some embodiments, the set processing order may be predefined, which may not require bitstream signaling. In alternative embodiments, the choice of processing order may be signaled in the bitstream.

According to exemplary embodiments of the present invention, at the encoder, the pixel values in the blocks in a first plurality of blocks may be predicted using the pixel values from only the neighboring left and/or upper encoded macroblocks using the nine prediction modes defined for H.264/AVC. The mode for each block in the first plurality of blocks may be selected according to mode-selection methods known in the art, and the residual for each block may be encoded. Correspondingly, at the decoder, the pixel values in the blocks in the first plurality of blocks may be predicted using the pixel values from only the reconstructed neighboring left and/or upper macroblocks.

Figure 9:
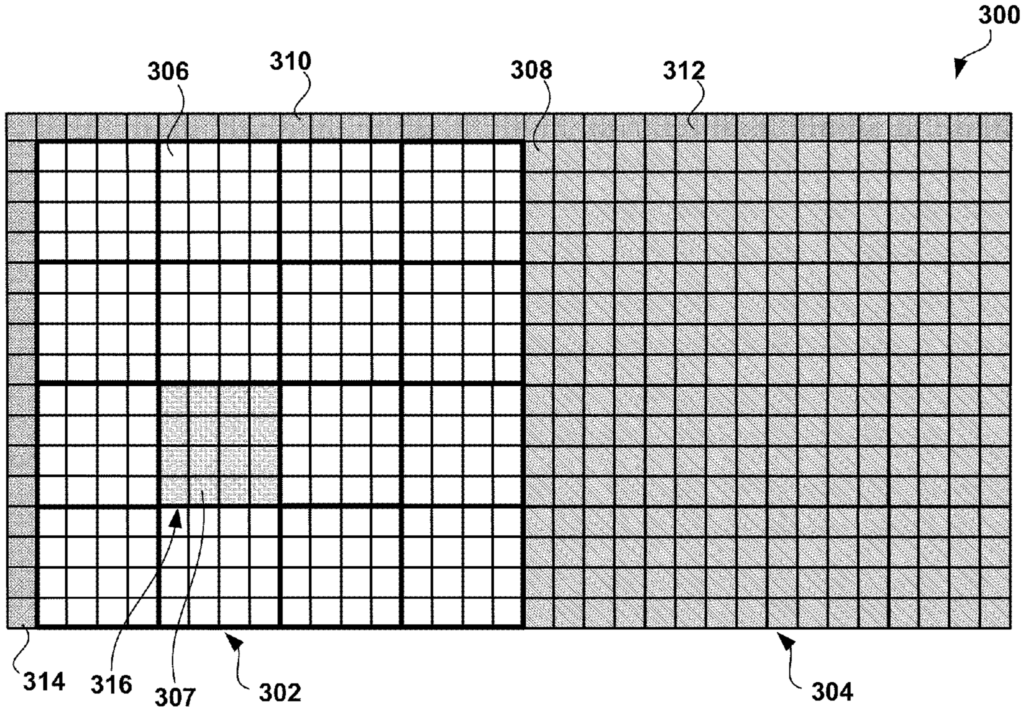
FIG. 9 is a picture depicting an exemplary portion of an image comprising two 16×16 macroblocks and neighboring macroblock pixels.

The encoding and decoding of the blocks in the set of blocks processed first may be understood in relation to FIG. 9. FIG. 9 depicts an exemplary portion 300 of an image comprising two 16×16 macroblocks 302, 304. In the encoding and decoding of the macroblock on the left 302 (pixels shown in white, for example, 306 and pixels shown in dotted-hash, for example, 307), the pixel values in the macroblock on the right 304 (pixels shown in negative-slope hatching, for example, 308) are unavailable since this macroblock 304 has not been reconstructed. However, the pixels in the neighboring macroblocks above and to the left of the current macroblock 302 are available. The pixels in the neighboring macroblocks above and to the left, for example, 310, 312, 314, of the current macroblock 302 are shown in cross-hatch. For a block, for example, 316 (shown in dotted-hatch), in the set of blocks encoded first, the pixel values may be predicted from the available pixel values in the neighboring macroblocks above and to the left of the current macroblock (for example, the pixels shown in cross-hatch). In some embodiments of the present invention, at the encoder, the values may be predicted for each prediction mode, and the mode yielding the smallest residual error may be selected. In alternative embodiments, other mode selection methods known in the art may be used to select the prediction mode.

In some embodiments of the present invention, the predicted pixel values may be determined according to H.264/AVC 4×4 prediction equations extended to a macroblock.

In some embodiments of the present invention, prediction, for an N×N block, according to mode 0—vertical-mode intra prediction—may be performed according to the pseudo code, where pred[y][x] denotes the predicted pixel value, y denotes the row index and x denotes the column index:

```
// Vertical
// pU array holds upper neighbors
BLOCK_SIZE = N ;
for (y=0; y<BLOCK_SIZE; y++)
    for (x=0; x<BLOCK_SIZE; x++)
        pred[y][x] = pU[x];
// end pseudo code.
```

In some embodiments of the present invention, prediction, for an N×N block, according to mode 1—horizontal-mode intra prediction—may be performed according to the pseudo code, where pred[y][x] denotes the predicted pixel value, y denotes the row index and x denotes the column index:

```
// Horizontal
// pL array holds left neighbors
BLOCK_SIZE = N ;
for (y=0; y<BLOCK_SIZE; y++)
    for (x=0; x<BLOCK_SIZE; x++)
        pred[y][x] = pL[y];
// end pseudo code.
```

In some embodiments of the present invention, prediction, for an N×N block, where $N=2^n$, according to mode 2—DC-mode intra prediction—may be performed according to the pseudo code, where pred[y][x] denotes the predicted pixel value, y denotes the row index and x denotes the column index:

```
// DC
// pU array holds upper neighbors
// pL array holds left neighbors
BLOCK_SIZE = N ;
if all pU samples and all pL samples are available then
  for (y=0; y<BLOCK_SIZE; y++)
    for (x=0; x<BLOCK_SIZE; x++)
    {
      pred[y][x] = (pU[0] + pU[1] + ... + pU[N −1] +
        pL[0] + pL[1] + ... + pL[N − 1] + (1<<n )) >> (n +1);
```

-continued

```
    }
if any pU samples are unavailable and all pL samples are available then
  for (y=0; y<BLOCK_SIZE; y++)
    for (x=0; x<BLOCK_SIZE; x++)
    {
      pred[y][x] = (pL[0] + pL[1] + ... + pL[N −1] + (1<<(n −1))) >> n
    }
if all pU samples are available and any pL samples are unavailable then
  for (y=0; y<BLOCK_SIZE; y++)
    for (x=0; x<BLOCK_SIZE; x++)
    {
      pred[y][x] = (pU[0] + pU[1] + ... + pU[ N −1] + (1<<( n −1))) >> n ;
    }
if any pU samples are unavailable and any pL samples are unavailable then
  for (y=0; y<BLOCK_SIZE; y++)
    for (x=0; x<BLOCK_SIZE; x++)
    {
      pred[y][x] = DefaultValue; // DefaultValue = 2^(b−1) for an
      image with
bitdepth = b
    }
// end pseudo code.
```

In some embodiments of the present invention, prediction, for an N×N block, according to mode 3—diagonal-down-left-mode intra prediction—may be performed according to the pseudo code, where pred[y][x] denotes the predicted pixel value, y denotes the row index and x denotes the column index:

```
// Diagonal Down Left
// pU array holds upper neighbors
// pL array holds left neighbors
BLOCK_SIZE = N ;
bound = BLOCK_SIZE-1;
for (y=0; y<BLOCK_SIZE; y++)
  for (x=0; x<BLOCK_SIZE; x++)
  {
    if (x!=bound||y!=bound)
      pred[y][x] = (pU[x+y] + 2*pU[x+y+1] + pU[x+y+2] +2) >> 2;
    else
      pred[y][x] = (pU[bound*2] + 3*pU[bound*2+1] +2) >> 2;
  }
// end pseudo code.
```

In some embodiments of the present invention, prediction, for an N×N block, according to mode 4—diagonal-down-right-mode intra prediction—may be performed according to the pseudo code, where pred[y][x] denotes the predicted pixel value, y denotes the row index and x denotes the column index:

```
// Diagonal Down Right
// pU array holds upper neighbors
// pL array holds left neighbors
BLOCK_SIZE = N ;
bound = BLOCK_SIZE-1;
if (x>y)
  pred[y][x] = (pU[x−y−2] + 2*pU[x−y−1] + pU[x−y] +2) >> 2;
else if (x<y)
  pred[y][x] = (pL[y−x−2] + 2*pL[y−x−1] + pL[y−x] +2) >> 2;
  else
  pred[y][x] = (pU[0] + 2*pU[−1] + pL[0] +2) >> 2;
// end pseudo code.
```

In some embodiments of the present invention, prediction, for an N×N block, according to mode 5—vertical-right-mode intra prediction—may be performed according to the pseudo code, where pred[y][x] denotes the predicted pixel value, y denotes the row index and x denotes the column index:

```
// Vertical Right
// pU array holds upper neighbors
// pL array holds left neighbors
BLOCK_SIZE = N ;
bound = BLOCK_SIZE-1;
zVR = 2*x−y;
if ( ((zVR&0xl) == 0) && (zVR>=0) && zVR<=2*bound )
   pred[y][x] = (pU[x−(y>>1)−1] + pU[x−(y>>1)] +1) >> 1;
else if ( ((zVR&0x1) == 1) && (zVR> 0) && zVR<2*bound)
   pred[y][x] = (pU[x−(y>>1)−2] + 2*pU[x−(y>>1)−1] +
   pU[x−(y>>1)] +2) >> 2;
else if (zVR == −1)
   pred[y][x] = (pL[0] + 2*pU[−1] + pU[0] +2) >> 2;
else
   pred[y][x] = (pL[y−(x<<1)−1] + 2*pL[y−(x<<1)−2] +
   pL[y−(x<<1)−3] +2) >> 2;
// end pseudo code.
```

In some embodiments of the present invention, prediction, for an N×N block, according to mode 6—horizontal-down-mode intra prediction—may be performed according to the pseudo code, where pred[y][x] denotes the predicted pixel value, y denotes the row index and x denotes the column index:

```
// Horizontal Down
// pU array holds upper neighbors
// pL array holds left neighbors
BLOCK_SIZE = N ;
bound = BLOCK_SIZE-1;
zHD = 2*y−x;
if ( ((zHD&0x1) == 0) && (zHD>=0) && zHD<=2*bound )
   pred[y][x] = (pL[y−(x>>1)−1] + pL[y−(x>>1)] +1) >> 1;
else if ( ((zHD&0x1) == 1) && (zHD>0) && zHD<2*bound)
   pred[y][x] = (pL[y−(x>>1)−2] + 2*pL[y−(x>>1)−1] +
   pL[y−(x>>1)] +2) >> 2;
else if (zHD == −1)
   pred[y][x] = (pL[0] + 2*pU[−1] + pU[0] +2) >> 2;
else
   pred[y][x] = (pU[x−(y<<1)−1] + 2*pU[x−(y<<1)−2] +
   pU[x−(y<<1)−3] +2) >> 2;
// end pseudo code.
```

In some embodiments of the present invention, prediction, for an N×N block, according to mode 7—vertical-left-mode intra prediction—may be performed according to the pseudo code, where pred[y][x] denotes the predicted pixel value, y denotes the row index and x denotes the column index:

```
// Vertical Left
// pU array holds upper neighbors
// pL array holds left neighbors
BLOCK_SIZE = N ;
bound = BLOCK_SIZE-1;
if ((y&0x1) == 0) //even
   pred[y][x] = (pU[x+(y>>1)] + pU[x+(y>>1)+1] +1) >> 1;
else //odd
   pred[y][x] = (pU[x+(y>>1)] + 2*pU[x+(y>>1)+1] +
   pU[x+(y>>1)+2] +2) >> 2;
// end pseudo code.
```

In some embodiments of the present invention, prediction \, for an N×N block, according to mode 8—horizontal-up-mode intra prediction—may be performed according to the pseudo code, where pred[y][x] denotes the predicted pixel value, y denotes the row index and x denotes the column index:

```
// Horizontal Up
// pU array holds upper neighbors
// pL array holds left neighbors
BLOCK_SIZE = N ;
bound = BLOCK_SIZE-1;
zHU = x+2*y;
  if ( ((zHU&0x1) == 0) && zHU<=2*(bound−1) )
    pred[y][x] = (pL[y+(x>>1)] + pL[y+(x>>1)+1]+1) >> 1;
  else if ( ((zHU&0x1) ==1) && zHU<2*(bound−1))
    pred[y][x] = (pL[y+(x>>1) + 2*pL[y+(x>>1)+1] +
    pL[y+(x>>1)+2] +2) >>2;
  else if (zHU>2*bound−1)
    pred[y][x] = pL[bound];
  else // (zHU==2*bound−1) 29 for MB, 13 for 8×8 block, 5 for 4×4 block
    pred[y][x] = (pL[bound−1] + 3*pL[bound] +2) >>2;
// end pseudo code.
```

The above-listed pseudo code is provided for illustration and not for limitation, and there is no intention to exclude alternative implementations and extensions of the above-described prediction formulae.

In some embodiments of the present invention, in DC prediction (mode 2), and other prediction modes, the neighboring upper and left macroblock pixel values may be weighted according to their distance to the block that is being predicted. For example, when predicting the pixel values in the exemplary block 316 in FIG. 9, the pixel values in the left neighboring macroblock may be given more weight than the pixel values in the upper neighboring macroblocks. In some embodiments of the present invention, the distance may be defined as the number of macroblocks plus one between the block being predicted and the neighboring upper macroblock and the number of macroblocks plus one between the block being predicted and the neighboring left macroblock In alternative embodiments of the present invention, the distance may be defined as the number of macroblocks between the block being predicted and the neighboring upper/left macroblock in the order of a zig-zag scan. In some embodiments of the present invention, a weight assigned to the neighboring upper block pixel values may be the ratio of the distance between the block being predicted and the neighboring left macroblock and the sum of the distances between the block being predicted and both the neighboring left and upper macroblocks. In some embodiments of the present invention, a weight assigned to the neighboring left block pixel values may be the ratio of the distance between the block being predicted and the neighboring upper macroblock and the sum of the distances between the block being predicted and both the neighboring left and upper macroblocks.

Some embodiments of the present invention may comprise mode prediction. To reduce the bits used to signal the intra modes, in H.264/AVC the intra prediction mode for a block may be predicted from the modes of the upper neighboring block and the left neighboring block according to Min(intraM×MPredModeA, intraM×MPredModeB), where intraM×MPredModeA denotes the mode of the left neighbor block and intraM×MPredModeB denotes the mode of the upper neighbor block. A rate-distortion optimized (RDO) decision may be made at an encoder when determining the intra modes. In the RDO decision step, a rate calculation may be made to calculate the rate used by sending intra modes.

According to some embodiments of the present invention, for blocks in a first plurality of blocks encoded first using reconstructed pixels from neighboring macroblocks, the modes of the closest available blocks that are also within the first plurality of blocks or neighboring macroblocks may be used during mode prediction and during rate-distortion optimization. An available block may refer to a block for which an intra-prediction mode has been determined.

Figure 10:
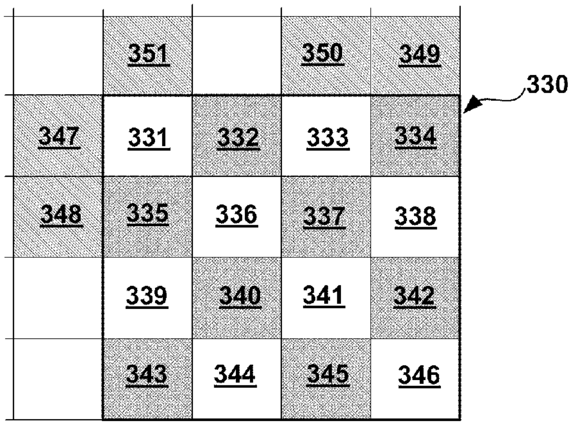
FIG. 10 is a picture depicting an exemplary partitioning of a macroblock into two sets of blocks according to embodiments of the present invention and neighboring blocks used for mode prediction.

These embodiments may be understood in relation to an example shown in FIG. 10. FIG. 10 depicts an exemplary macroblock 330. The blocks 331-346 of the macroblock 330 may be partitioned, for example, according to a checker-board pattern, into two pluralities of blocks: a first plurality 332, 334, 335, 337, 340, 342, 343, 345 and a second plurality 331, 333, 336, 338, 339, 341, 344, 346. For this example, all of the blocks within the first plurality of blocks may be processed, in a zig-zag order 332, 335, 334, 337, 340, 343, 342, 345, before the blocks within the second plurality of blocks.

According to some embodiments of the present invention, during mode prediction, block 337 may use, for its upper mode, the mode of block 332 since block 333 has not been processed, and block 332 is the nearest available block, for the zig-zag processing order of this example, above the block 337 for which mode prediction is being performed. In some embodiments of the present invention, the nearest block may be determined based on the Euclidean distance between the blocks. For its left mode, block 337 may use the mode of block 335 since block 336 has not been processed, and block 335 is the nearest available block, for the zig-zag processing order of this example, to the left of the block 337 for which mode prediction is being performed. In these embodiments of the present invention, mode prediction may use a block above, but not directly above, the block for which the mode prediction is being performed. In these embodiments of the present invention, mode prediction may use a block to the left of, but not directly to the left of, the block for which the mode prediction is being performed.

For further illustration, according to some embodiments of the present invention in which an intra-prediction mode is predicted from a block above and a block to the left of the block for which the mode prediction is being performed, mode prediction for block 335 in FIG. 10 may use, for its left mode, the mode of block 348 in the neighboring available macroblock and, for its upper mode, the mode of block 347 in the neighboring available macroblock. In alternative embodiments of the present invention, the mode of block 351 in the neighboring available macroblock may be used for the upper mode.

For further illustration, according to some embodiments of the present invention in which an intra-prediction mode is predicted from a block above and a block to the left of the block for which the mode prediction is being performed, mode prediction for block 334 in FIG. 10 may use, for its left mode, the mode of available block 332 and, for its upper mode, the mode of block 349 in the neighboring available macroblock. In alternative embodiments of the present invention, the mode of block 350 in the neighboring available macroblock may be used for the left mode.

In alternative embodiments, mode prediction may use the modes of other available blocks located directionally relative to the block for which the mode is being predicted. For example, an intra-prediction mode for a block may be predicted from the mode of a lower block and a right block.

In alternative embodiments, the modes of blocks in previously encoded neighboring macroblocks may be used in mode prediction. These embodiments may be understood in relation to an example shown in FIG. 10. According to these embodiments of the present invention, during mode prediction, block 337 may use, for its upper mode, the mode of block 350 from the previously encoded, upper neighboring macroblock, and for its mode, the mode of block 348 from the previously encoded, left neighboring macroblock.

In some embodiments of the present invention, both of the above-described methods of mode prediction may be available. An encoder may signal, in the bitstream, the mode-prediction method used for a plurality of blocks. In some embodiments of the present invention, the signaling may occur with meta-data which may include a picture parameter set, a sequence parameter set or other parameter set. In some embodiments of the present invention, the signaling may occur at the macroblock level. In alternative embodiments of the present invention, the signaling may occur at the slice level.

In some embodiments of the present invention, for blocks in a plurality of blocks processed subsequent to a first plurality of blocks, the modes of the closest available blocks that are in the current or preceding plurality of blocks or neighboring macroblocks may be used during mode prediction and rate-distortion optimization. In alternative embodiments of the present invention, for blocks in a plurality of blocks processed subsequent to a first plurality of blocks, only the modes of the closest available blocks that are in the current plurality of blocks or neighboring macroblocks may be used during mode prediction and rate-distortion optimization. In some embodiments of the present invention, blocks in different pluralities of blocks may use different methods for intra prediction. For these blocks, only the modes of the closest available blocks that are in the current or neighboring macroblocks and that use the same method for intra prediction may be used during mode prediction and rate-distortion optimization. In some embodiments of the present invention, the different method for intra-prediction may be signaled with a flag. In some embodiments of the present invention, the different methods for intra-prediction may be signaled with multiple flags.

For blocks in a set of blocks reconstructed subsequent to the first set of blocks reconstructed, in addition to previously reconstructed upper and/or left neighboring blocks, previously reconstructed right and bottom neighboring blocks may be available for intra prediction. These additional reconstructed blocks may be used to improve the intra prediction and, therefore, improve the coding efficiency due to the high correlation between blocks.

In some embodiments of the present invention, a previously reconstructed non-neighboring block may be used in intra prediction. In some of these embodiments, the contribution of a previously reconstructed signal value to the prediction value may be weighted by the distance of the reconstructed block to the current block.

In some embodiments of the present invention, the equations related to the previously described nine prediction mode directions, which may be referred to as standard-defined prediction-mode directions associated with standard-defined prediction modes, may be modified to use previously encoded blocks to the right of and/or below a current block for intra prediction. An exemplary modification of the prediction formulas for the exemplary partition shown in FIG. 4 may be illustrated for intra 4×4 prediction and may be understood in relation to FIG. 11 and Table 1.

Figure 11:
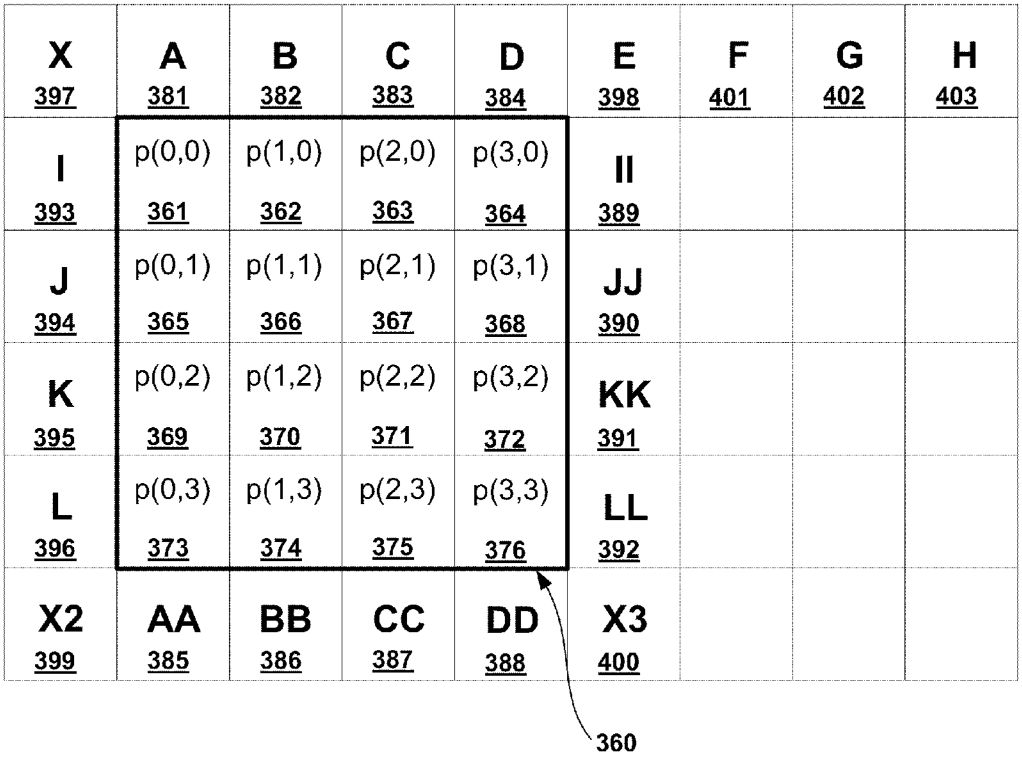
FIG. 11 is a picture depicting an exemplary macroblock and neighboring pixels.

FIG. 11 shows an exemplary 4×4 block 360 of sixteen pixels 361-376, where a pixel in column x and row y is denoted p (x,y). If the block 360 is one 4×4 block in a 16×16 macroblock partitioned in a checker-board pattern according to FIG. 4, and the block 360 is in the second plurality of blocks encoded, previously reconstructed pixels 381-396 are available above (381-384), below (385-388), to the right (389-392) and to the left (393-396) of the macroblock 360. The values of the corner pixels 397-400 may not be available. In some embodiments, these unavailable corner pixel values may be interpolated from the neighboring, available pixel values. In some embodiments, the pixel values may be interpolated according to:

$$X=(A+I+1)>>1$$

$$E=(D+II+1)>>1$$

$$X2=(L+AA+1)>>1$$

$$X3=(DD+LL+1)>>1,$$

where the pixel values are as indicated in FIG. 11. Table 1 shows both the original prediction equations and the modified, also considered extended, prediction equations. In some embodiments, if a pixel value required for an intra-prediction mode is not available, then the mode may not be used. Note that for some prediction modes, no modification of the original prediction formula is made.

Figure 12:
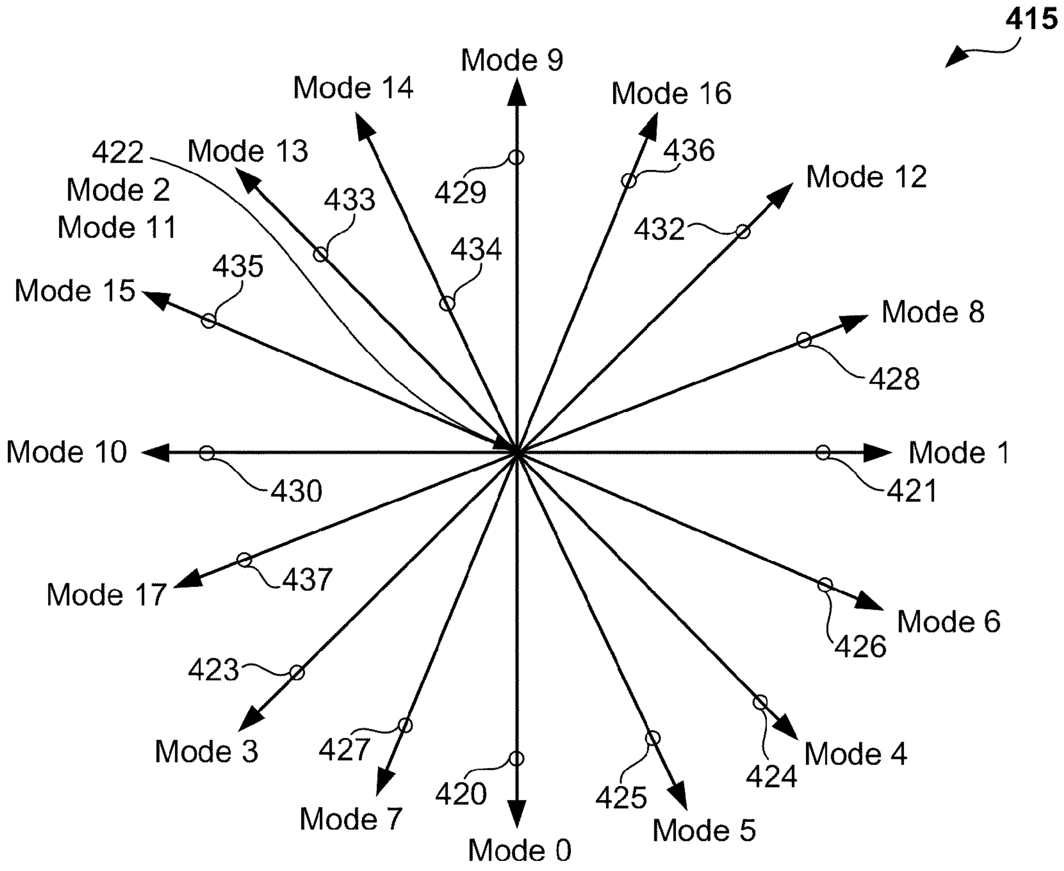
FIG. 12 is a picture depicting 18 intra-prediction-mode directions according to embodiments of the present invention.

FIG. 12, the direction of the arrow depicting the mode indicates the prediction direction for each mode.

In FIG. 12, the center point 422 does not represent a direction so this point may be associated with DC prediction modes, which may be referred to as "mode 2" and "mode 11." In some embodiments of the present invention, "mode 2" predicted values may be predicted, for 4×4 intra prediction, according to:

$$p(0,0)=p(1,0)=P(2,0)=P(3,0)=$$

$$p(0,1)=p(1,1)=P(2,1)=P(3,1)=$$

$$p(0,2)=p(1,2)=P(2,2)=P(3,2)=$$

$$p(0,3)=p(1,3)=P(2,3)=P(3,3)=$$

$$(A+B+C+D+I+J+K+L+(1<<2))>>3,$$

TABLE 1

Prediction Formulas - Original and Modified

| ORIGINAL FORMULAS | MODIFIED FORMULAS |
|---|---|
| Intra_4×4_DC | Intra_4×4_DC_modified |
| (Mode 2) | (Mode 2 - modified) |
| p(0, 0) = p(1, 0) = P(2, 0) = P(3, 0) = | p(0, 0) = p(1, 0) = P(2, 0) = P(3, 0) = |
| p(0, 1) = p(1, 1) = P(2, 1) = P(3, 1) = | p(0, 1) = p(1, 1) = P(2, 1) = P(3, 1) = |
| p(0, 2) = p(1, 2) = P(2, 2) = P(3, 2) = | p(0, 2) = p(1, 2) = P(2, 2) = P(3, 2) = |
| p(0, 3) = p(1, 3) = P(2, 3) = P(3, 3) = | p(0, 3) = p(1, 3) = P(2, 3) = P(3, 3) = |
| (A + B + C + D + I + J + K + L + (1 << 2)) >> 3 | (A + AA + B + BB + C + CC + D + DD + |
| If all neighbors are available. | I + II + J + JJ + K + KK + L + LL + (1 << 3)) >> 4 |
| | If all neighbors are available. |
| Intra_4×4_Diagonal_Down_Left | Intra_4×4_Diagonal_Down_Left_modified |
| (Mode 3) | (Mode 3 - modified) |
| p(0, 0) = (A + C + 2*B + 2) >> 2 | p(0, 0) = (A + C + 2*B + 2) >> 2 |
| p(1, 0) = p(0, 1) = (B + D + 2*C + 2) >> 2 | p(1, 0) = p(0, 1) = (B + D + 2*C + 2) >> 2 |
| p(2, 0) = p(1, 1) = p(0, 2) = (C + E + 2*D + 2) >> 1 | p(2, 0) = p(1, 1) = p(0, 2) = (C + E + 2*D + 2) >> 1 |
| p(3, 0) = p(2, 1) = p(1, 2) = p(0, 3) = (D + F + 2*E + 2) >> 2 | p(3, 0) = p(2, 1) = p(1, 2) = p(0, 3) = (D + 2*E + II + 2) >> 2 |
| p(3, 1) = p(2, 2) = p(1, 3) = (E + G + 2*F + 2) >> 2 | p(3, 1) = p(2, 2) = p(1, 3) = (E + 2*II + JJ + 2) >> 2 |
| p(3, 2) = p(2, 3) = (F + H + 2*G) >> 2 | p(3, 2) = p(2, 3) = (II + 2*JJ + KK) >> 2 |
| p(3, 3) = (G + 3*H + 2) >> 2 | p(3, 3) = (JJ + 2*KK + LL + 2) >> 2 |
| Intra_4×4_Vertical_Left | Intra_4×4_Vertical_Left _modified |
| (Mode 7) | (Mode 7 - modified) |
| p(0, 0) = (A + B + 1) >> 1 | p(0, 0) = (A + B + 1) >> 1 |
| p(1, 0) = p(0, 2) = (B + C + 1) >> 1 | p(1, 0) = p(0, 2) = (B + C + 1) >> 1 |
| p(2, 0) = p(1, 2) = (C + D + 1) >> 1 | p(2, 0) = p(1, 2) = (C + D + 1) >> 1 |
| p(3, 0) = p(2, 2) = (D + E + 1) >> 1 | p(3, 0) = p(2, 2) = (D + E + 1) >> 1 |
| p(3, 2) = (E + F + 1) >> 1 | p(3, 2) = (E + 2*II + JJ + 2) >> 2 |
| p(0, 1) = (A + 2*B + C + 2) >> 2 | p(0, 1) = (A + 2*B + C + 2) >> 2 |
| p(1, 1) = p(0, 3) = (B + 2*C + D + 2) >> 2 | p(1, 1) = p(0, 3) = (B + 2*C + D + 2) >> 2 |
| p(2, 1) = p(1, 3) = (C + 2*D + E + 2) >> 2 | p(2, 1) = p(1, 3) = (C + 2*D + E + 2) >> 2 |
| p(3, 1) = p(2, 3) = (D + 2*E + F + 2) >> 2 | p(3, 1) = p(2, 3) = (D + 2*E + II + 2) >> 2 |
| p(3, 3) = (E + 2*F + G + 2) >> 2 | p(3, 3) = (II + 2*JJ + KK + 2) >> 2 |
| Intra_4×4_Horizontal_Up | Intra_4×4_Horizontal_Up_modified |
| (Mode 8) | (Mode 8 - modified) |
| p(0, 0) = (I + J + 1) >> 1 | p(0, 0) = (I + J + 1) >> 1 |
| p(1, 0) = (I + 2*J + K + 2) >> 2 | p(1, 0) = (I + 2*J + K + 2) >> 2 |
| p(2, 0) = p(0, 1) = (J + K + 1) >> 1 | p(2, 0) = p(0, 1) = (J + K + 1) >> 1 |
| p(3, 0) = p(1, 1) = (J + 2*K + L + 2) >> 2 | p(3, 0) = p(1, 1) = (J + 2*K + L + 2) >> 2 |
| p(2, 1) = p(0, 2) = (K + L + 1) >> 1 | p(2, 1) = p(0, 2) = (K + L + 1) >> 1 |
| p(3, 1) = p(1, 2) = (K + 3*L + 2) >> 2 | p(3, 1) = p(1, 2) = (K + 2*L + X2 + 2) >> 2 |
| p(0, 3) = p(1, 3) = p(2, 2) = p(2, 3) = p(3, 2) = p(3, 3) = L | p(2, 2) = p(0, 3) = (L + X2 + 1) >> 1 |
| | p(1, 3) = p(3, 2) = (L + 2*X2 + AA + 2) >> 2 |
| | p(2, 3) = (X2 + 2*AA + BB + 2) >> 2 |
| | p(3, 3) = (AA + 2*BB + CC + 2) >> 2 |

In some embodiments of the present invention, nine directional intra-prediction modes opposite in direction to the nine intra-prediction mode directions previously described may be defined. These opposite-direction modes may be described in relation to FIG. 12. Pixel values in a current block may be predicted from pixel values in reconstructed blocks above, to the left of, below and/or to the right of the current block. In and "mode 11" predicted values may be predicted, for 4×4 intra prediction, according to:

$$p(0,0)=p(1,0)=P(2,0)=P(3,0)=$$

$$p(0,1)=p(1,1)=P(2,1)=P(3,1)=$$

$$p(0,2)=p(1,2)=P(2,2)=P(3,2)=$$

$$p(0,3)=p(1,3)=P(2,3)=P(3,3)=$$

$$(AA+BB+CC+DD+II+JJ+KK+LL+(1<<2))>>3,$$

where the pixel locations and values may be as shown in FIG. 11. In alternative embodiments, "mode 2" and "mode 11" predicted values may be predicted, for 4×4 intra prediction, according to:

$$p(0,0)=p(1,0)=P(2,0)=P(3,0)=$$

$$p(0,1)=p(1,1)=P(2,1)=P(3,1)=$$

$$p(0,2)=p(1,2)=P(2,2)=P(3,2)=$$

$$p(0,3)=p(1,3)=P(2,3)=P(3,3)=$$

$$(A+AA+B+BB+C+CC+D+DD+$$

$$I+II+J+JJ+K+KK+L+LL+(1<<3))>>4.$$

A vertical arrow 420 extending in the downward direction from the center point 422 may represent a first vertical prediction mode, which may be referred to as "mode 0," and a vertical arrow 429 extending in the upward direction from the center point 422 may represent a second vertical prediction mode, which may be referred to as "mode 9." In some embodiments of the present invention, "mode 0" predicted values may be predicted, for 4×4 intra prediction, according to:

$$p(0,0)=p(0,1)=P(0,2)=P(0,3)=A$$

$$p(1,0)=p(1,1)=P(1,2)=P(0,3)=B$$

$$p(2,0)=p(2,1)=P(2,2)=P(2,3)=C$$

$$p(3,0)=p(3,1)=P(3,2)=P(3,3)=D,$$

and "mode 9" predicted values may be predicted, for 4×4 intra prediction, according to:

$$p(0,0)=p(0,1)=P(0,2)=P(0,3)=AA$$

$$p(1,0)=p(1,1)=P(1,2)=P(0,3)=BB$$

$$p(2,0)=p(2,1)=P(2,2)=P(2,3)=CC$$

$$p(3,0)=p(3,1)=P(3,2)=P(3,3)=DD,$$

where the pixel locations and values may be as shown in FIG. 11.

A horizontal arrow 421 extending to the right from the center point 422 may represent a first horizontal prediction mode, which may be referred to as "mode 1." A horizontal arrow 430 extending to the left from the center point 422 may represent a second horizontal prediction mode, which may be referred to as "mode 10." In some embodiments of the present invention, "mode 1" predicted values may be predicted, for 4×4 intra prediction, according to:

$$p(0,0)=p(1,0)=P(2,0)=P(3,0)=I$$

$$p(0,1)=p(1,1)=P(2,1)=P(3,1)=J$$

$$p(0,2)=p(1,2)=P(2,2)=P(3,2)=K$$

$$p(0,3)=p(1,3)=P(2,3)=P(3,3)=L,$$

and "mode 10" predicted values may be predicted, for 4×4 intra prediction, according to:

$$p(0,0)=p(1,0)=P(2,0)=P(3,0)=II$$

$$p(0,1)=p(1,1)=P(2,1)=P(3,1)=JJ$$

$$p(0,2)=p(1,2)=P(2,2)=P(3,2)=KK$$

$$p(0,3)=p(1,3)=P(2,3)=P(3,3)=LL,$$

where the pixel locations and values may be as shown in FIG. 11.

An arrow 423 extending from the center point 422 diagonally downward to the left at approximately a 45 degree angle from horizontal may represent a diagonal down-left (DDL) prediction mode, also referred to as "mode 3," and an arrow 432 extending from the center point 422 in a direction 180 degrees opposite may represent a diagonal up-right (DUR) prediction mode, which may be referred to as "mode 12" or a DDL 2 mode. In some embodiments of the present invention, "mode 3" predicted values may be predicted, for 4×4 intra prediction, according to:

$$p(0,0)=(A+C+2*B+2)>>2$$

$$p(1,0)=p(0,1)=(B+D+2*C+2)>>2$$

$$p(2,0)=p(1,1)=p(0,2)=(C+E+2*D+2)>>1$$

$$p(3,0)=p(2,1)=p(1,2)=p(0,3)=(D+2*E+II+2)>>2$$

$$p(3,1)=p(2,2)=p(1,3)=(E+2*H+JJ+2)>>2$$

$$p(3,2)=p(2,3)=(II+2*JJ+KK)>>2$$

$$p(3,3)=(JJ+2*KK+LL+2)>>2,$$

where the pixel locations and values may be as shown in FIG. 11. In some embodiments of the present invention, "mode 12" predicted values may be predicted, for 4×4 intra prediction, by rotating the block data and the neighboring data by 90 degrees clockwise and using the "mode 4" prediction equations:

$$p(0,0)=p(1,1)=p(2,2)=p(3,3)=(I+2*X+A+2)>>2$$

$$p(1,0)=p(2,1)=p(3,2)=(X+2*A+B+2)>>2$$

$$p(2,0)=p(3,1)=(A+2*B+C+2)>>2$$

$$p(3,0)=(B+2*C+D+2)>>2$$

$$p(0,1)=p(1,2)=p(2,3)=(J+2*I+X+2)>>2$$

$$p(0,2)=p(1,3)=(K+2*J+I+2)>>2$$

$$p(0,3)=(L+2*K+J+2)>>2,$$

where the pixel locations and values may be as shown in FIG. 11.

Figure 13A:
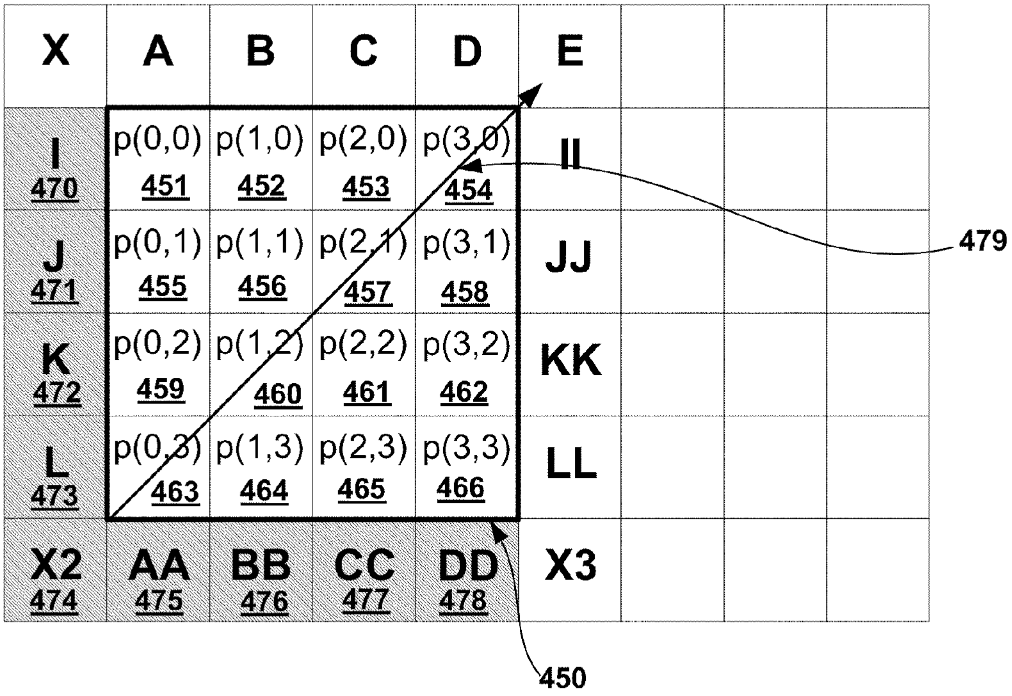
FIG. 13A is a picture depicting an intra-prediction-mode direction, according to embodiments of the present invention, in a direction opposite to a diagonal down left intra-prediction-mode direction.
Figure 13B:
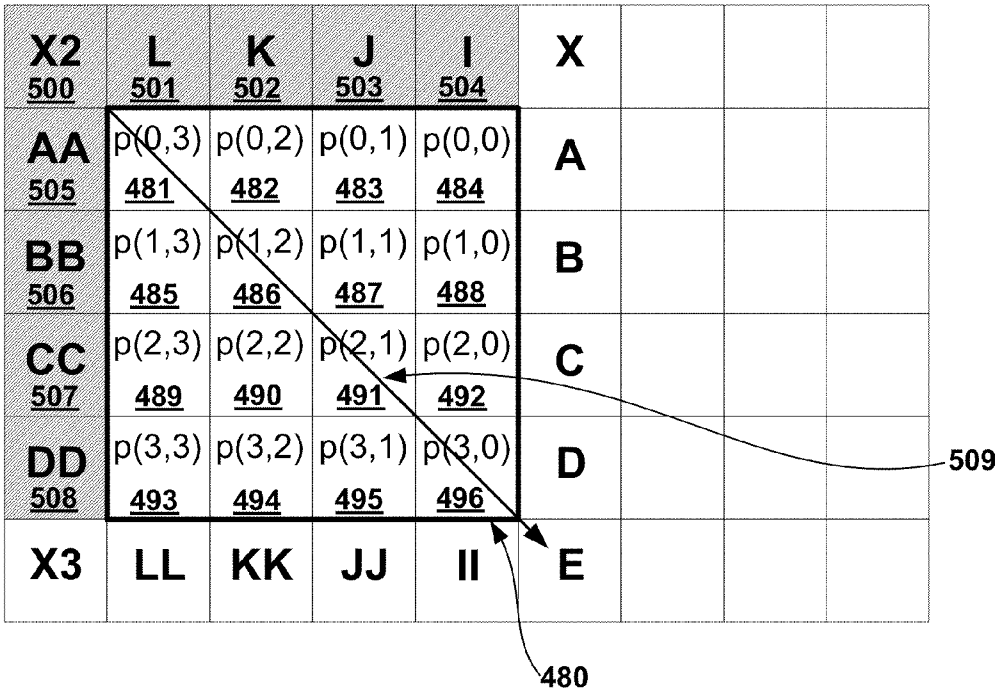
FIG. 13B is a picture depicting intra prediction, according to embodiments of the present invention, in an intra-prediction-mode direction opposite to a diagonal down left intra-prediction-mode direction through rotation and use of the "mode 4" prediction equations.

FIG. 13A and FIG. 13B illustrate this process. As depicted in FIG. 13A, a 4×4 block 450 of sixteen pixels 451-466 may be predicted in the diagonal up-right direction 479 from the reconstructed pixel values to the left 470-473 and below 475-478 and an interpolated corner pixel value 474. FIG. 13B depicts the pixels of FIG. 13A after a 90 degree clockwise rotation. A 4×4 block 480 of sixteen pixels 481-496 may be predicted in the diagonal down-right direction 509 from the reconstructed pixels to the left 505-508 and above 501-504 and an interpolated corner pixel 500 using the "mode 4" prediction equations. These predicted pixel values 481-496 may be mapped back to the proper pixels by a 90 degree counter-clockwise rotation. In some embodiments of the present invention, the "mode 12" predicted values may be predicted through rotation and using the "mode 4" prediction equations. In alternative embodiments, the "mode 12" predicted values may be directly predicted, for 4×4 intra prediction, according to:

$p(0,3)=p(1,2)=p(2,1)=p(3,0)=(AA+2*X2+L+2)>>2$ $p(0,2)=p(1,1)=p(2,0)=(X2+2*L+K+2)>>2$ $p(1,0)=p(0,1)=(L+2*K+J+2)>>2$ $p(0,0)=(K+2*J-F1-F2)>>2$ $p(3,1)=p(1,3)=p(2,2)=(BB+2*AA+X2+2)>>2$ $p(2,3)=p(3,2)=(CC+2*BB+AA+2)>>2$ $p(3,3)=(DD+2*CC+BB+2)>>2,$ where the pixel values and locations are shown in FIG. 13A.

An arrow 424 extending from the center point 422 diagonally downward to the right at approximately a 45 degree angle from horizontal may represent a diagonal down-right (DDR) prediction mode, also referred to as "mode 4," and an arrow 433 extending from the center point 422 in a direction 180 degrees opposite may represent a diagonal up-left (DUL) prediction mode, which may be referred to as "mode 13" or a DDR 2 mode. In some embodiments of the present invention, "mode 4" predicted values may be predicted, for 4×4 intra prediction, according to:

$p(0,0)=p(1,1)=p(2,2)=p(3,3)=(I+2*X+A+2)>>2$ $p(1,0)=p(2,1)=p(3,2)=(X+2*A+B+2)>>2$ $p(2,0)=p(3,1)=(A+2*B+C+2)>>2$ $p(3,0)=(B+2*C+D+2)>>2$ $p(0,1)=p(1,2)=p(2,3)=(J+2*I+X+2)>>2$ $p(0,2)=p(1,3)=(K+2*J+I+2)>>2$ $p(0,3)=(L+2*K+J+2)>>2,$ where the pixel locations and values may be as shown in FIG. 11. In some embodiments of the present invention, "mode 13" predicted values may be predicted, for 4×4 intra prediction, by rotating the block data and the neighboring data by 180 degrees and using the "mode 4" prediction equations.

Figure 14A:
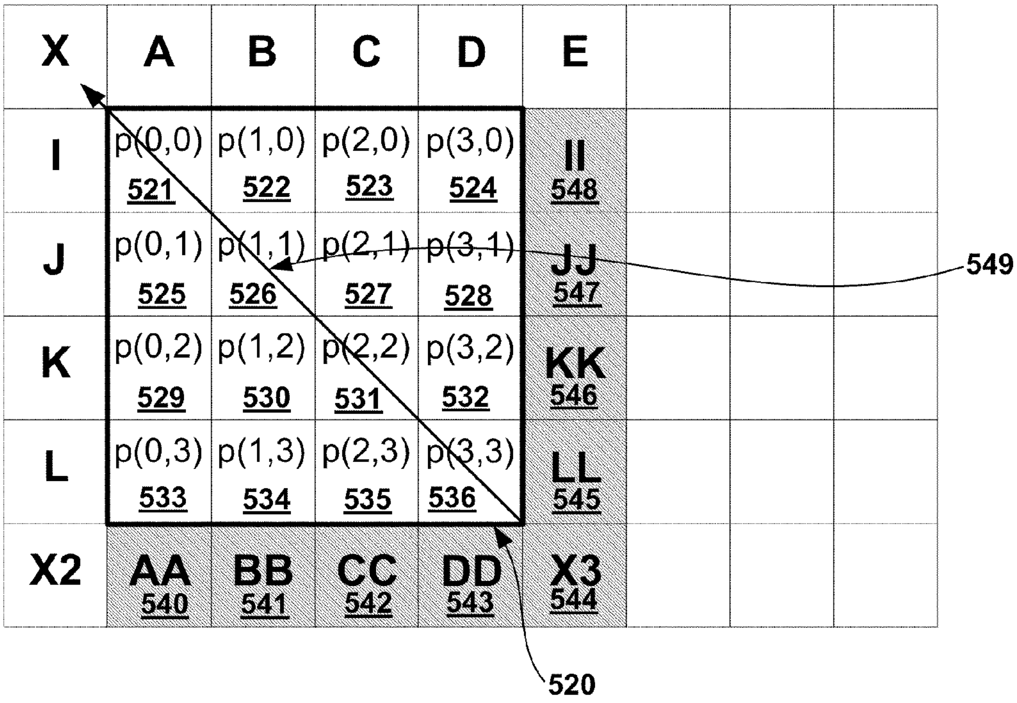
FIG. 14A is a picture depicting an intra-prediction-mode direction, according to embodiments of the present invention, in a direction opposite to a diagonal down right intra-prediction-mode direction.
Figure 14B:
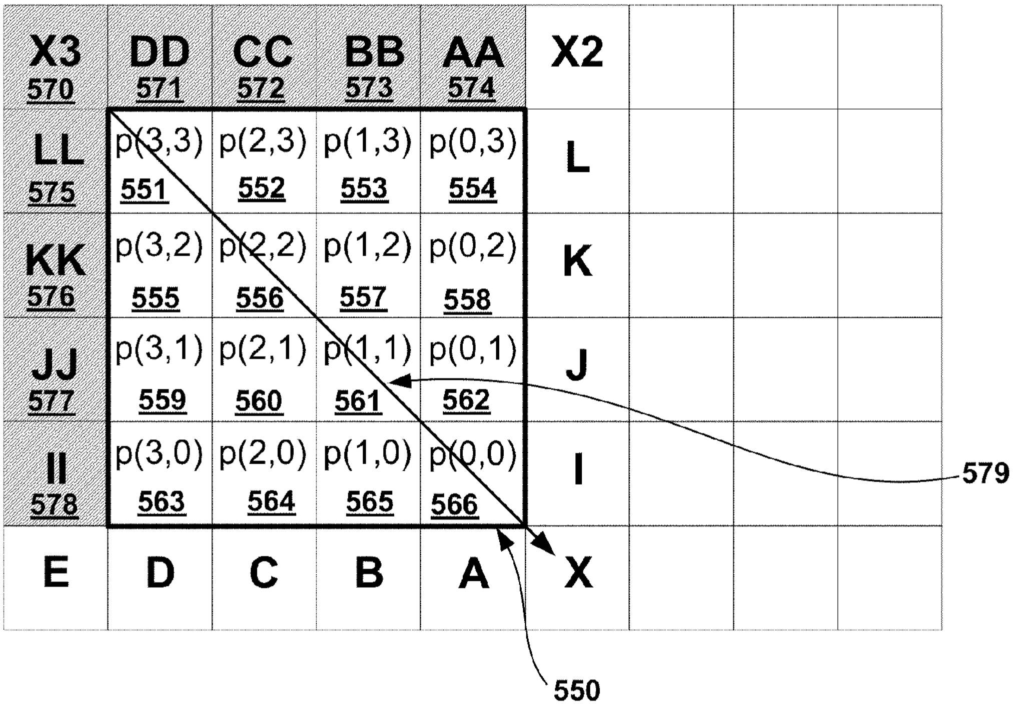
FIG. 14B is a picture depicting intra prediction, according to embodiments of the present invention, in an intra-prediction-mode direction opposite to a diagonal down right intra-prediction-mode direction through rotation and use of the "mode 4" prediction equations.

FIG. 14A and FIG. 14B illustrate this process. As depicted in FIG. 14A, a 4×4 block 520 of sixteen pixels 521-536 may be predicted in the diagonal up-left direction 549 from the reconstructed pixel values to the right 545-548 and below 540-543 and an interpolated corner pixel value 544. FIG. 14B depicts the pixels of FIG. 14A after a 180 degree rotation. A 4×4 block 550 of sixteen pixels 551-566 may be predicted in the diagonal down-right direction 579 from the reconstructed pixels to the left 575-578 and above 571-574 and an interpolated corner pixel 570 using the "mode 4" prediction equations. These predicted pixel values 551-566 may be mapped back to the proper pixels by a 180 degree rotation. In some embodiments of the present invention, the "mode 13" predicted values may be predicted through rotation and using the "mode 4" prediction equations. In alternative embodiments, the "mode 13" predicted values may be directly predicted, for 4×4 intra prediction, according to:

$p(3,3)=p(2,2)=p(1,1)=p(0,0)=(LL+2*X3+DD+2)>>2$ $p(2,3)=p(0,1)=p(1,2)=(X3+2*DD+CC+2)>>2$ $p(1,3)=p(0,2)=(DD+2*CC+BB+2)>>2$ $p(0,3)=(CC+2*BB+AA+2)>>2$ $p(3,2)=p(2,1)=p(1,0)=(K+2*LL+X3+2)>>2$ $p(3,1)=p(2,0)=(JJ+2*KK+LL+2)>>2$ $p(3,0)=(II+2*JJ+KK+2)>>2,$ where the pixel values and locations are shown in FIG. 14A.

An arrow 425 extending from the center point 422 diagonally downward to the right at approximately a 67.5 degree angle from horizontal may represent a vertical right (VR) prediction mode, which may be referred to as "mode 5," and an arrow 434 extending from the center point 422 in a direction 180 degrees opposite may represent vertical right 2 prediction mode, which may be referred to as "mode 14" or a VR 2 mode. In some embodiments of the present invention, "mode 5" predicted values may be predicted, for 4×4 intra prediction, according to:

$p(0,0)=p(1,2)=(X+A+1)>>1$ $p(1,0)=p(2,2)=(A+B+1)>>1$ $p(2,0)=p(3,2)=(B+C+1)>>1$ $p(3,0)=(C+D+1)>>1$ $p(0,1)=p(1,3)=(I+2*X+A+2)>>2$ $p(1,1)=p(2,3)=(X+2*A+B+2)>>2$ $p(2,1)=p(3,3)=(A+2*B+C+2)>>2$ $p(3,1)=(B+2*C+D+2)>>2$ $p(0,2)=(X+2*I+J+2)>>2$ $p(0,3)=(I+2*J+K+2)>>2,$ where the pixel locations and values may be as shown in FIG. 11. In some embodiments of the present invention, "mode 14" predicted values may be predicted, for 4×4 intra prediction, by rotating the block data and the neighboring data by 180 degrees and using the "mode 5" prediction equations.

Figure 15A:
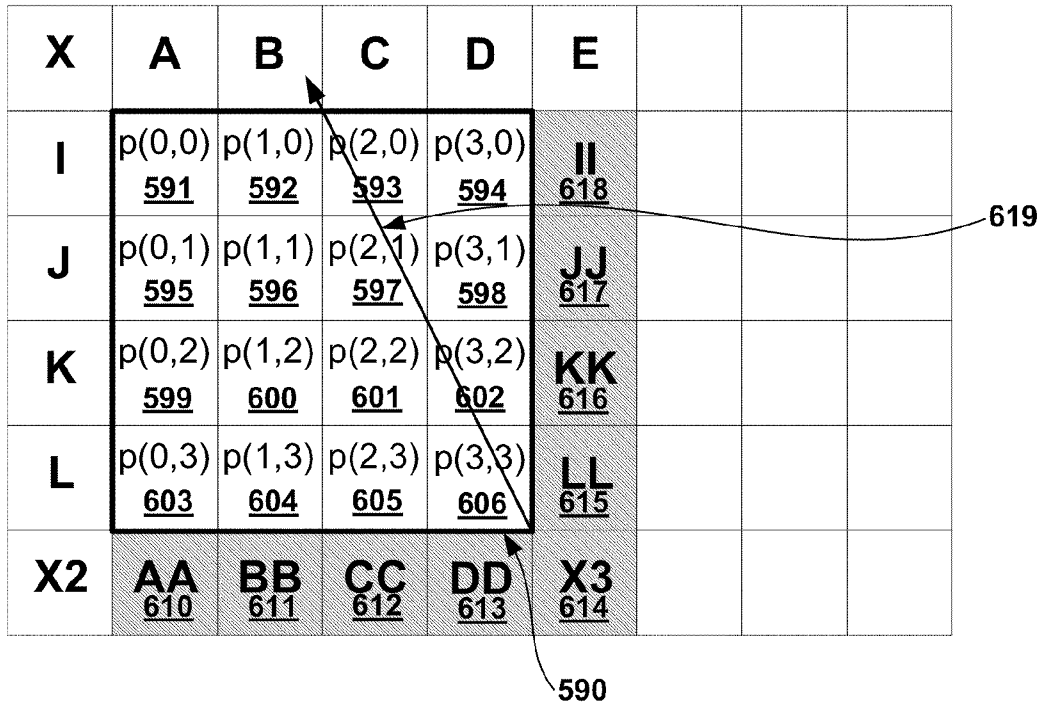
FIG. 15A is a picture depicting an intra-prediction-mode direction, according to embodiments of the present invention, in a direction opposite to a vertical right intra-prediction-mode direction.
Figure 15B:
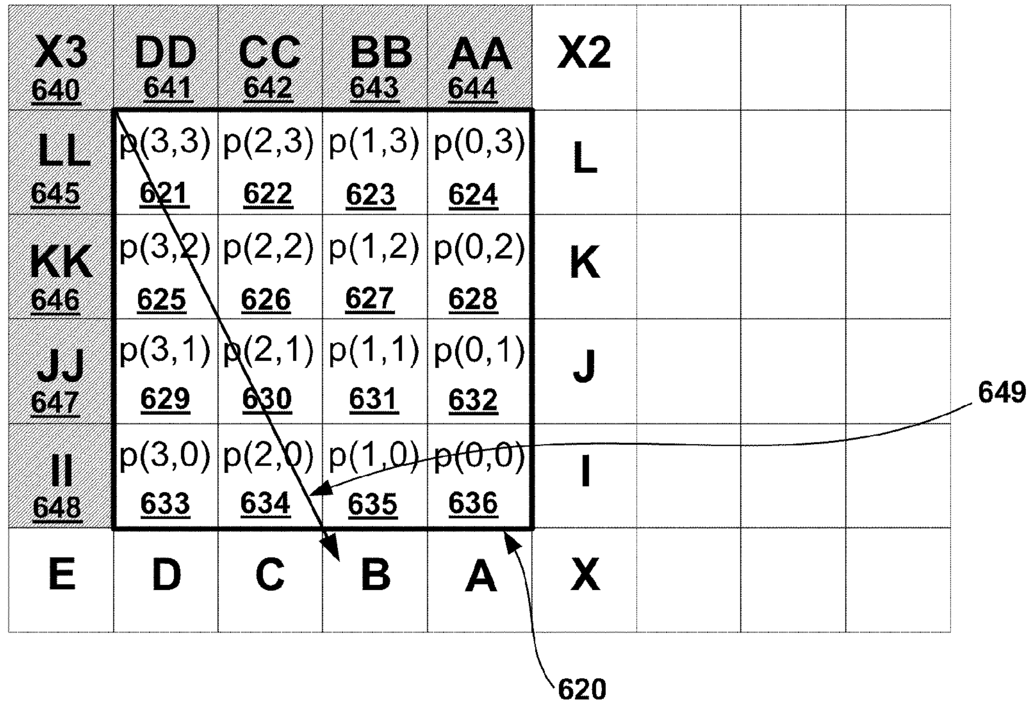
FIG. 15B is a picture depicting intra prediction, according to embodiments of the present invention, in an intra-prediction-mode direction opposite to a vertical right intra-prediction-mode direction through rotation and use of the "mode 5" prediction equations.

FIG. 15A and FIG. 15B illustrate this process. As depicted in FIG. 15A, a 4×4 block 590 of sixteen pixels 591-606 may be predicted in the vertical right 2 direction 619 from the reconstructed pixel values to the right 615-618 and below 610-613 and an interpolated corner pixel value 614. FIG. 15B depicts the pixels of FIG. 15A after a 180 degree rotation. A 4×4 block 620 of sixteen pixels 621-636 may be predicted in the vertical right direction 649 from the reconstructed pixels to the left 645-648 and above 641-644 and an interpolated corner pixel 640 using the "mode 5" prediction equations. These predicted pixel values 621-636 may be mapped back to the proper pixels by a 180 degree rotation. In some embodiments of the present invention, the "mode 14" predicted values may be predicted through rotation and using the "mode 5" prediction equations. In alternative embodiments, the "mode 14" predicted values may be directly predicted, for 4×4 intra prediction, according to:

$p(3,3)=p(2,1)=(X3+DD+1)>>1$ $p(2,3)=p(1,1)=(DD+CC+1)>>1$ $p(1,3)=p(0,1)=(CC+BB+1)>>1$ $p(0,3)=(BB+AA+1)>>1$ $p(3,2)=p(2,0)=(LL+2*X3+DD+2)>>2$ $p(2,2)=p(1,0)=(X3+2*DD+CC+2)>>2$ $p(1,2)=p(0,0)=(DD+2*CC+BB+2)>>2$ $p(3,1)=(X3+2*LL+KK+2)>>2$ $p(3,0)=(LL+2*KK+JJ+2)>>2$ where the pixel values and locations are shown in FIG. 15A.

An arrow 426 extending from the center point diagonally downward to the right at approximately a 22.5 degree angle from horizontal may represent a horizontal down (HD) prediction mode, which may be referred to as "mode 6," and an arrow 435 extending from the center point 422 in a direction 180 degrees opposite may represent a horizontal down 2 prediction mode, which may be referred to as "mode 15" or an HD 2 mode. In some embodiments of the present invention, "mode 6" predicted values may be predicted, for 4×4 intra prediction, according to:

$p(0,0)=p(2,1)=(X+I+1)>>1$ $p(1,0)=p(3,1)=(I+2*X+A+2)>>2$ $p(2,0)=(X+2*A+B+2)>>2$ $p(3,0)=(A+2*B+C+2)>>2$ $p(0,1)=p(2,2)=(I+J+1)>>1$ $p(1,1)=p(3,2)=(X+2*I+J+2)>>2$ $p(0,2)=p(2,3)=(J+K+1)>>1$ $p(1,2)=p(3,3)=(I+2*J+K+2)>>2$ $p(0,3)=(K+L+1)>>1$ $p(1,3)=(J+2*K+L+2)>>2$ where the pixel locations and values may be as shown in FIG. 11. In some embodiments of the present invention, "mode 15" predicted values may be predicted, for 4×4 intra prediction, by rotating the block data and the neighboring data by 180 degrees and using the "mode 6" prediction equations.

Figure 16A:
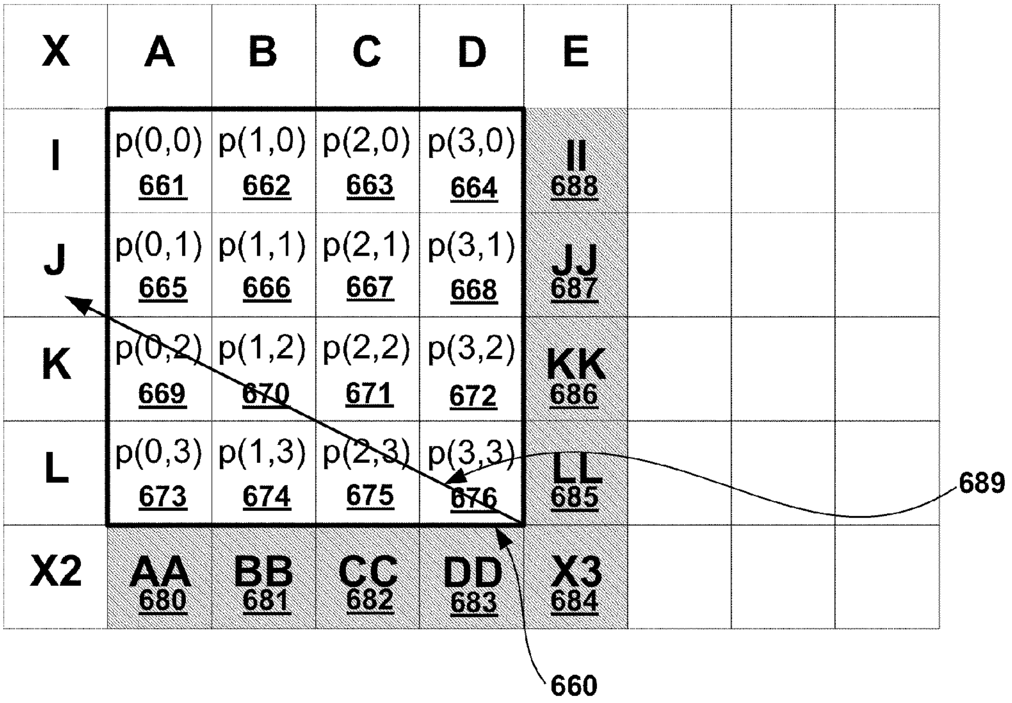
FIG. 16A is a picture depicting an intra-prediction-mode direction, according to embodiments of the present invention, in a direction opposite to a horizontal down intra-prediction-mode direction.
Figure 16B:
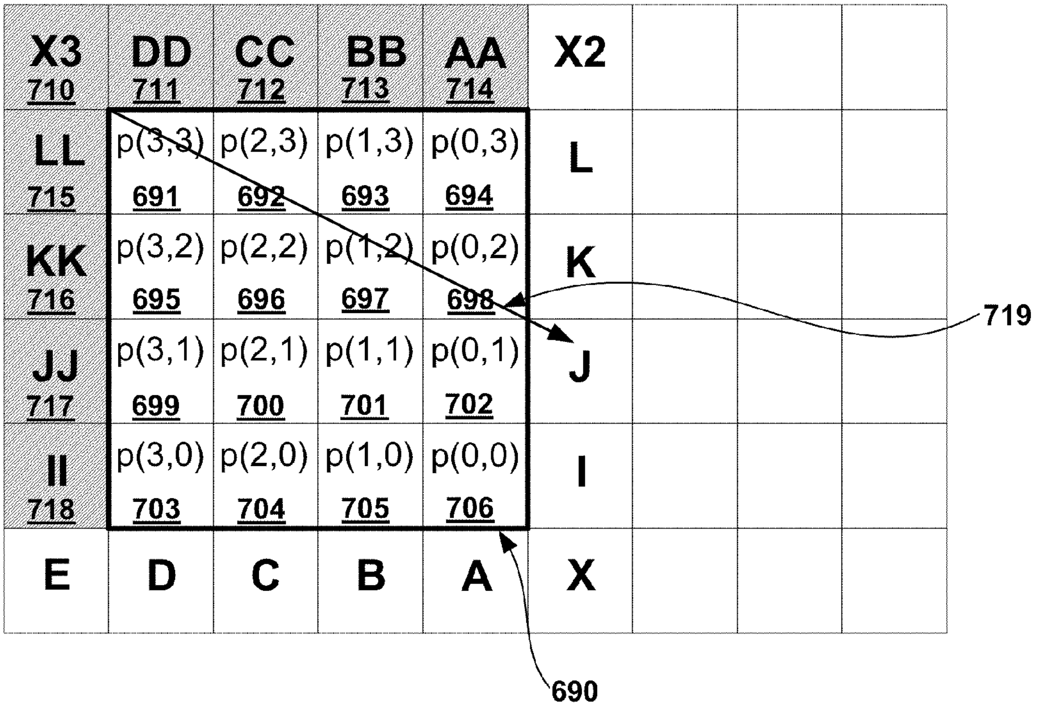
FIG. 16B is a picture depicting intra prediction, according to embodiments of the present invention, in an intra-prediction-mode direction opposite to a horizontal down intra-prediction-mode direction through rotation and use of the "mode 6" prediction equations.

FIG. 16A and FIG. 16B illustrate this process. As depicted in FIG. 16A, a 4×4 block 660 of sixteen pixels 561-676 may be predicted in the horizontal down 2 direction 689 from the reconstructed pixel values to the right 685-688 and below 680-683 and an interpolated corner pixel value 684. FIG. 16B depicts the pixels of FIG. 16A after a 180 degree rotation. A 4×4 block 690 of sixteen pixels 691-706 may be predicted in the horizontal down direction 719 from the reconstructed pixels to the left 715-718 and above 711-714 and an interpolated corner pixel 710 using the "mode 6" prediction equations. These predicted pixel values 691-706 may be mapped back to the proper pixels by a 180 degree rotation. In some embodiments of the present invention, the "mode 15" predicted values may be predicted through rotation and using the "mode 6" prediction equations. In alternative embodiments, the "mode 15" predicted values may be directly predicted, for 4×4 intra prediction, according to:

$p(3,3)=p(1,2)=(X3+LL+1)>>1$ $p(2,3)=p(0,2)=(LL+2*X3+DD+2)>>2$ $p(1,3)=(X3+2*DD+CC+2)>>2$ $p(0,3)=(DD+2*CC+BB+2)>>2$ $p(3,2)=p(1,1)=(LL+KK+1)>>1$ $p(2,2)=p(0,1)=(X3+2*LL+KK+2)>>2$ $p(3,1)=p(1,0)=(KK+JJ+1)>>1$ $p(2,1)=p(0,0)=(LL+2*KK+JJ+2)>>2$ $p(3,0)=(JJ+II+1)>>1$ $p(2,0)=(KK+2*JJ+II+2)>>2,$ where the pixel values and locations are shown in FIG. 16A.

An arrow 427 extending from the center point 422 diagonally downward to the left at approximately a 67.5 degree angle from horizontal may represent a vertical left (VL) prediction mode, which may be referred to as "mode 7," and an arrow 436 extending from the center point 422 in a direction 180 degrees opposite may represent a vertical left 2 prediction mode, which may be referred to as "mode 16" or a VL 2 mode. In some embodiments of the present invention, "mode 7" predicted values may be predicted, for 4×4 intra prediction, according to:

$p(0,0)=(A+B+1)>>1$ $p(1,0)=p(0,2)=(B+C+1)>>1$ $p(2,0)=p(1,2)=(C+D+1)>>1$ $p(3,0)=p(2,2)=(D+E+1)>>1$ $p(3,2)=(E+2*II+JJ+2)>>2$ $p(0,1)=(A+2*B+C+2)>>2$ $p(1,1)=p(0,3)=(B+2*C+D+2)>>2$ $p(2,1)=p(1,3)=(C+2*D+E+2)>>2$ $p(3,1)=p(2,3)=(D+2*E+II+2)>>2$ $p(3,3)=(II+2*JJ+KK+2)>>2,$ where the pixel locations and values may be as shown in FIG. 11. In some embodiments of the present invention, "mode 16" predicted values may be predicted, for 4×4 intra prediction, by rotating the block data and the neighboring data by 90 degrees clockwise and using the "mode 6" prediction equations.

Figure 17A:
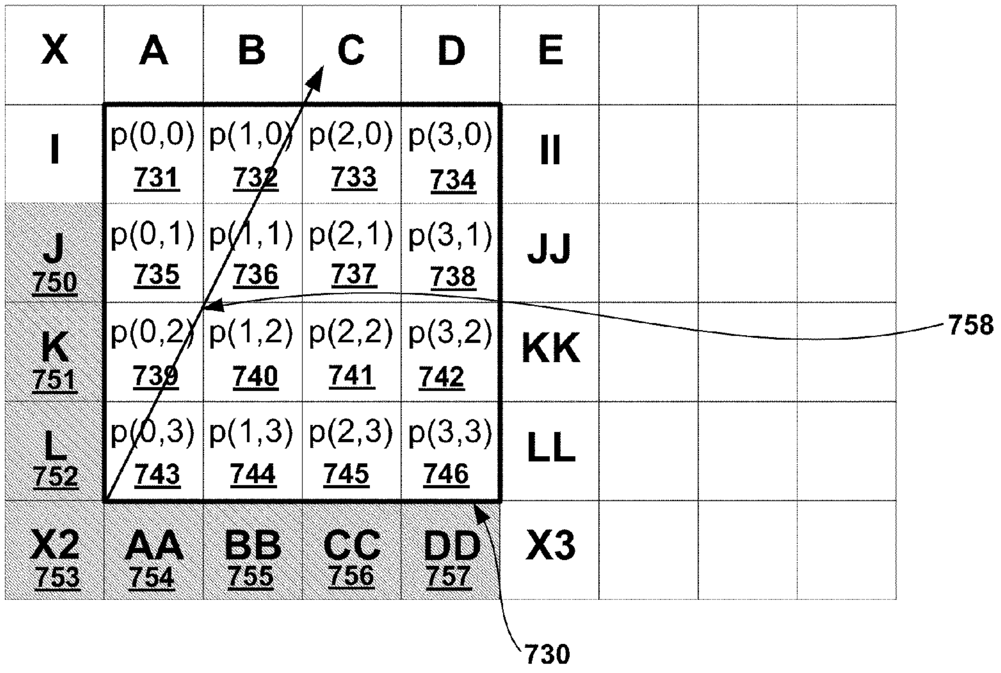
FIG. 17A is a picture depicting an intra-prediction-mode direction, according to embodiments of the present invention, in a direction opposite to a vertical left intra-prediction-mode direction.
Figure 17B:
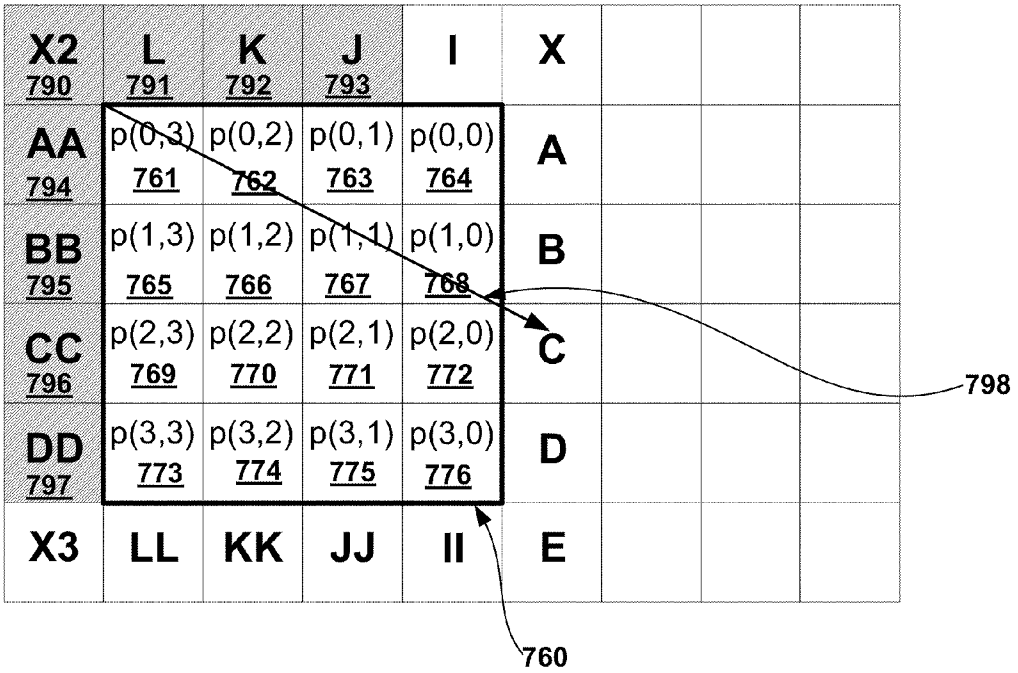
FIG. 17B is a picture depicting intra prediction, according to embodiments of the present invention, in an intra-prediction-mode direction opposite to a vertical left intra-prediction-mode direction through rotation and use of the "mode 6" prediction equations.

FIG. 17A and FIG. 17B illustrate this process. As depicted in FIG. 17A, a 4×4 block 730 of sixteen pixels 731-746 may be predicted in the vertical left 2 direction 758 from the reconstructed pixel values to the left 750-752 and below 754-757 and an interpolated corner pixel value 753. FIG. 17B depicts the pixels of FIG. 17A after a 90 degree clockwise rotation. A 4×4 block 760 of sixteen pixels 761-776 may be predicted in the horizontal down direction 798 from the reconstructed pixels to the left 794-797 and above 791-793 and an interpolated corner pixel 790 using the "mode 6" prediction equations. These predicted pixel values 761-776 may be mapped back to the proper pixels by a 90 degree clockwise rotation. In some embodiments of the present invention, the "mode 16" predicted values may be predicted through rotation and using the "mode 6" prediction equations. In alternative embodiments, the "mode 16" predicted values may be directly predicted, for 4×4 intra prediction, according to:

$p(0,3)=p(1,1)=(X2+AA+1)>>1$ $p(0,2)=p(1,0)=(AA+2*X2+L+2)>>2$ $p(0,1)=(X2+2*L+K+2)>>2$ $p(0,0)=(L+2*K+J+2)>>2$ $p(1,3)=p(2,1)=(AA+BB+1)>>1$ $$p(1,2)=p(2,0)=(X2+2*AA+BB+2)>>2$$

$$p(2,3)=p(3,1)=(BB+CC+1)>>1$$

$$p(2,2)=p(3,0)=(AA+2*BB+CC+2)>>2$$

$$p(3,3)=(CC+DD+1)>>1$$

$$p(3,2)=(BB+2*CC+DD+2)>>2,$$

where the pixel values and locations are shown in FIG. 17A.

An arrow 428 extending from the center point diagonally upward to the right at approximately a 22.5 degree angle from horizontal may represent a horizontal up (HU) prediction mode, also referred to as "mode 8," and an arrow 437 extending from the center point 422 in a direction 180 degrees opposite may represent a horizontal up 2 prediction mode, which may be referred to as "mode 17" or an HU 2 mode. In some embodiments of the present invention, "mode 8" predicted values may be predicted, for 4×4 intra prediction, according to:

$$p(0,0)=(I+J+1)>>1$$

$$p(1,0)=(I+2*J+K+2)>>2$$

$$p(2,0)=p(0,1)=(J+K+1)>>1$$

$$p(3,0)=p(1,1)=(J+2*K+L+2)>>2$$

$$p(2,1)=p(0,2)=(K+L+1)>>1$$

$$p(3,1)=p(1,2)=(K+2*L+X2+2)>>2$$

$$p(2,2)=p(0,3)=(L+X2+1)>>1$$

$$p(1,3)=p(3,2)=(L+2*X2+AA+2)>>2$$

$$p(2,3)=(X2+2*AA+BB+2)>>2$$

$$p(3,3)=(AA+2*BB+CC+2)>>2,$$

where the pixel locations and values may be as shown in FIG. 11. In some embodiments of the present invention, "mode 17" predicted values may be predicted, for 4×4 intra prediction, by flipping the block data and the neighboring data across the right-side boundary and using the "mode 6" prediction equations.

FIG. 18A and FIG. 18B illustrate this process. As depicted in FIG. 18A, a 4×4 block 810 of sixteen pixels 811-826 may be predicted in the horizontal up 2 direction 838 from the reconstructed pixel values to the right 834-837 and above 830-832 and an interpolated corner pixel value 833. FIG. 18B depicts the pixels of FIG. 18A after a flip across the right-side boundary. A 4×4 block 840 of sixteen pixels 841-856 may be predicted in the horizontal down direction 868 from the reconstructed pixels to the left 864-867 and above 861-863 and an interpolated corner pixel 860 using the "mode 6" prediction equations. These predicted pixel values 841-856 may be mapped back to the proper pixels by an inverse flip across the left-side boundary. In some embodiments of the present invention, the "mode 17" predicted values may be predicted through flipping and using the "mode 6" prediction equations. In alternative embodiments, the "mode 17" predicted values may be directly predicted, for 4×4 intra prediction, according to:

$$p(3,0)=p(1,1)=(E+II+1)>>1$$

$$p(2,0)=p(0,1)=(II+2*E+D+2)>>2$$

$$p(1,0)=(E+2*D+C+2)>>2$$

$$p(0,0)=(D+2*C+B+2)>>2$$

$$p(3,1)=p(1,2)=(II+JJ+1)>>1$$

$$p(2,1)=p(0,2)=(E+2*II+JJ+2)>>2$$

$$p(3,2)=p(1,3)=(JJ+KK+1)>>1$$

$$p(2,2)=p(0,3)=(II+2*JJ+KK+2)>>2$$

$$p(3,3)=(KK+LL+1)>>1$$

$$p(2,3)=(JJ+2*KK+LL+2)>>2,$$

where the pixel values and locations are shown in FIG. 18A.

An advantage of intra prediction using an opposite-direction mode may be understood in relation to FIG. 19. FIG. 19 depicts an exemplary block 900 of sixteen pixels 901-916. When the block 900 is in a set of blocks reconstructed subsequent to the reconstruction of all blocks within a first set of blocks in a macroblock partitioned according to a checkerboard pattern, reconstructed pixel values (for example, 931-938) in neighboring blocks other than the left-neighboring block and the above neighboring-block may be available to use for intra prediction in addition to pixels 925-928 within the left-neighboring block and pixels 921-924 within the above-neighboring block. For images with luminance content, for example, that as illustrated in FIG. 19 by white pixels 901-907, 909, 910, 913, 931, 921-928, 935, 940-942 and gray pixels 908, 911, 912, 914-916, 932-934, 936-938, 943, 950-957 the pixel values of the gray pixels 908, 911, 912, 914-916, 932-934 within the block 900 may be better predicted from the reconstructed pixel values in the right-neighboring block and the below-neighboring block. Thus, the use of the opposite-direction prediction modes may increase the compression efficiency due to the higher correlation between the pixel values being predicted and the reconstructed pixel values used in the prediction.

In general, with increased number of prediction modes to select from, encoding efficiency may be increased due to better pixel value prediction. However, with more prediction modes, there may be increased signaling requirements. In some embodiments of the present invention, an encoder may balance the number of modes with the increased overhead associated with additional prediction modes.

In some embodiments of the present invention, a pixel value in a block in a set of blocks reconstructed subsequent to the first set of blocks reconstructed may be predicted according to a prediction mode, wherein the prediction mode is one of the standard-defined prediction modes.

In alternative embodiments of the present invention, a pixel value in a block in a set of blocks reconstructed subsequent to the first set of blocks reconstructed may be predicted according to a prediction mode, wherein the prediction mode is one of the above-defined opposite-direction modes.

In still alternative embodiments of the present invention, a pixel value in a block in a set of blocks reconstructed subsequent to the first set of blocks reconstructed may be predicted by weighted interpolation of the values predicted by two modes that are of 180 degrees different in prediction direction. In some embodiments, a pixel value may be predicted according to:

$$p(y,x)=w_{p1}(y,x)*p1(y,x)+(1-w_{p1}(y,x))p2(y,x),$$

where p(y,x) may denote the predicted pixel value at location (y,x), p1 and p2 may denote two prediction modes with opposite prediction directions and $w_{p1}(y,x)$ may denote a weight associated with prediction mode p1 at location (y,x). In some embodiments of the present invention, the weights may be approximately proportional to the distance to the prediction neighbors. Table 2 shows exemplary weights for 4×4 intra prediction. In some embodiments of the present invention, the weights may be stored for each prediction-mode direction. In alternative embodiments of the present invention, weights for a subset of prediction-mode directions may be stored, and weights for an un-stored prediction-mode direction may be generated by a transformation, for example, a rotation or flipping, of an appropriate stored weighting table.

TABLE 2

Exemplary Weights for Opposite-Direction-Mode Interpolation

Weighted Interpolated Modes

Mode 0 and Mode 9

| | | | |
|---|---|---|---|
| $w_m(0,0)$ | $w_m(1,0)$ | $w_m(2,0)$ | $w_m(3,0)$ |
| $w_m(0,1)$ | $w_m(1,1)$ | $w_m(2,1)$ | $w_m(3,1)$ |
| $w_m(0,2)$ | $w_m(1,2)$ | $w_m(2,2)$ | $w_m(3,2)$ |
| $w_m(0,3)$ | $w_m(1,3)$ | $w_m(2,3)$ | $w_m(3,3)$ |

$$p(y,x) = w_0(y,x)\,p_0(y,x) + w_9(y,x)\,p_9(y,x)$$
$$w_0(y,x) = 1 - w_9(y,x)$$

Mode 1 and Mode 10

| | | | |
|---|---|---|---|
| $w_m(0,0)$ | $w_m(1,0)$ | $w_m(2,0)$ | $w_m(3,0)$ |
| $w_m(0,1)$ | $w_m(1,1)$ | $w_m(2,1)$ | $w_m(3,1)$ |
| $w_m(0,2)$ | $w_m(1,2)$ | $w_m(2,2)$ | $w_m(3,2)$ |
| $w_m(0,3)$ | $w_m(1,3)$ | $w_m(2,3)$ | $w_m(3,3)$ |

$$p(y,x) = w_1(y,x)\,p_1(y,x) + w_{10}(y,x)\,p_{10}(y,x)$$
$$w_1(y,x) = 1 - w_{10}(y,x)$$

Mode 3 and Mode 12

| | | | |
|---|---|---|---|
| $w_m(0,0)$ | $w_m(1,0)$ | $w_m(2,0)$ | $w_m(3,0)$ |
| $w_m(0,1)$ | $w_m(1,1)$ | $w_m(2,1)$ | $w_m(3,1)$ |
| $w_m(0,2)$ | $w_m(1,2)$ | $w_m(2,2)$ | $w_m(3,2)$ |
| $w_m(0,3)$ | $w_m(1,3)$ | $w_m(2,3)$ | $w_m(3,3)$ |

$$p(y,x) = w_3(y,x)\,p_3(y,x) + w_{12}(y,x)\,p_{12}(y,x)$$
$$w_3(y,x) = 1 - w_{12}(y,x)$$

Mode 4 and Mode 13

| | | | |
|---|---|---|---|
| $w_m(0,0)$ | $w_m(1,0)$ | $w_m(2,0)$ | $w_m(3,0)$ |
| $w_m(0,1)$ | $w_m(1,1)$ | $w_m(2,1)$ | $w_m(3,1)$ |
| $w_m(0,2)$ | $w_m(1,2)$ | $w_m(2,2)$ | $w_m(3,2)$ |
| $w_m(0,3)$ | $w_m(1,3)$ | $w_m(2,3)$ | $w_m(3,3)$ |

$$p(y,x) = w_4(y,x)\,p_4(y,x) + w_{13}(y,x)\,p_{13}(y,x)$$
$$w_4(y,x) = 1 - w_{13}(y,x)$$

Mode 5 and Mode 14

| | | | |
|---|---|---|---|
| $w_m(0,0)$ | $w_m(1,0)$ | $w_m(2,0)$ | $w_m(3,0)$ |
| $w_m(0,1)$ | $w_m(1,1)$ | $w_m(2,1)$ | $w_m(3,1)$ |
| $w_m(0,2)$ | $w_m(1,2)$ | $w_m(2,2)$ | $w_m(3,2)$ |
| $w_m(0,3)$ | $w_m(1,3)$ | $w_m(2,3)$ | $w_m(3,3)$ |

$$p(y,x) = w_5(y,x)\,p_5(y,x) + w_{14}(y,x)\,p_{14}(y,x)$$
$$w_5(y,x) = 1 - w_{14}(y,x)$$

Mode 6 and Mode 15

TABLE 2-continued

Exemplary Weights for Opposite-Direction-Mode Interpolation

| | | | |
|---|---|---|---|
| $w_m(0,0)$ | $w_m(1,0)$ | $w_m(2,0)$ | $w_m(3,0)$ |
| $w_m(0,1)$ | $w_m(1,1)$ | $w_m(2,1)$ | $w_m(3,1)$ |
| $w_m(0,2)$ | $w_m(1,2)$ | $w_m(2,2)$ | $w_m(3,2)$ |
| $w_m(0,3)$ | $w_m(1,3)$ | $w_m(2,3)$ | $w_m(3,3)$ |

$$p(y,x) = w_6(y,x)\,p_6(y,x) + w_{15}(y,x)\,p_{15}(y,x)$$
$$w_6(y,x) = 1 - w_{15}(y,x)$$

Mode 7 and Mode 16

| | | | |
|---|---|---|---|
| $w_m(0,0)$ | $w_m(1,0)$ | $w_m(2,0)$ | $w_m(3,0)$ |
| $w_m(0,1)$ | $w_m(1,1)$ | $w_m(2,1)$ | $w_m(3,1)$ |
| $w_m(0,2)$ | $w_m(1,2)$ | $w_m(2,2)$ | $w_m(3,2)$ |
| $w_m(0,3)$ | $w_m(1,3)$ | $w_m(2,3)$ | $w_m(3,3)$ |

$$p(y,x) = w_7(y,x)\,p_7(y,x) + w_{16}(y,x)\,p_{16}(y,x)$$
$$w_7(y,x) = 1 - w_{16}(y,x)$$

Mode 8 and Mode 17

| | | | |
|---|---|---|---|
| $w_m(0,0)$ | $w_m(1,0)$ | $w_m(2,0)$ | $w_m(3,0)$ |
| $w_m(0,1)$ | $w_m(1,1)$ | $w_m(2,1)$ | $w_m(3,1)$ |
| $w_m(0,2)$ | $w_m(1,2)$ | $w_m(2,2)$ | $w_m(3,2)$ |
| $w_m(0,3)$ | $w_m(1,3)$ | $w_m(2,3)$ | $w_m(3,3)$ |

$$p(y,x) = w_8(y,x)\,p_8(y,x) + w_{17}(y,x)\,p_{17}(y,x)$$
$$w_8(y,x) = 1 - w_{17}(y,x)$$

Weights

Mode 0 $w_0(y,x)$

| | | | |
|---|---|---|---|
| $\frac{4}{5}$ | $\frac{4}{5}$ | $\frac{4}{5}$ | $\frac{4}{5}$ |
| $\frac{3}{5}$ | $\frac{3}{5}$ | $\frac{3}{5}$ | $\frac{3}{5}$ |
| $\frac{2}{5}$ | $\frac{2}{5}$ | $\frac{2}{5}$ | $\frac{2}{5}$ |
| $\frac{1}{5}$ | $\frac{1}{5}$ | $\frac{1}{5}$ | $\frac{1}{5}$ |

Mode 9 $w_9(y,x)$

| | | | |
|---|---|---|---|
| $\frac{1}{5}$ | $\frac{1}{5}$ | $\frac{1}{5}$ | $\frac{1}{5}$ |
| $\frac{2}{5}$ | $\frac{2}{5}$ | $\frac{2}{5}$ | $\frac{2}{5}$ |
| $\frac{3}{5}$ | $\frac{3}{5}$ | $\frac{3}{5}$ | $\frac{3}{5}$ |
| $\frac{4}{5}$ | $\frac{4}{5}$ | $\frac{4}{5}$ | $\frac{4}{5}$ |

Mode 1 $w_1(y,x)$

| | | | |
|---|---|---|---|
| $\frac{4}{5}$ | $\frac{3}{5}$ | $\frac{2}{5}$ | $\frac{1}{5}$ |
| $\frac{4}{5}$ | $\frac{3}{5}$ | $\frac{2}{5}$ | $\frac{1}{5}$ |
| $\frac{4}{5}$ | $\frac{3}{5}$ | $\frac{2}{5}$ | $\frac{1}{5}$ |
| $\frac{4}{5}$ | $\frac{3}{5}$ | $\frac{2}{5}$ | $\frac{1}{5}$ |

Mode 10 $w_{10}(y,x)$

| | | | |
|---|---|---|---|
| $\frac{1}{5}$ | $\frac{2}{5}$ | $\frac{3}{5}$ | $\frac{4}{5}$ |
| $\frac{1}{5}$ | $\frac{2}{5}$ | $\frac{3}{5}$ | $\frac{4}{5}$ |
| $\frac{1}{5}$ | $\frac{2}{5}$ | $\frac{3}{5}$ | $\frac{4}{5}$ |
| $\frac{1}{5}$ | $\frac{2}{5}$ | $\frac{3}{5}$ | $\frac{4}{5}$ |

Mode 3 $w_3(y,x)$

| | | | |
|---|---|---|---|
| $\frac{4}{8}$ | $\frac{5}{8}$ | $\frac{6}{8}$ | $\frac{7}{8}$ |
| $\frac{3}{8}$ | $\frac{4}{8}$ | $\frac{5}{8}$ | $\frac{6}{8}$ |
| $\frac{2}{8}$ | $\frac{3}{8}$ | $\frac{4}{8}$ | $\frac{5}{8}$ |
| $\frac{1}{8}$ | $\frac{2}{8}$ | $\frac{3}{8}$ | $\frac{4}{8}$ |

Mode 12 $w_{12}(y,x)$

| | | | |
|---|---|---|---|
| $\frac{4}{8}$ | $\frac{3}{8}$ | $\frac{2}{8}$ | $\frac{1}{8}$ |
| $\frac{5}{8}$ | $\frac{4}{8}$ | $\frac{3}{8}$ | $\frac{2}{8}$ |
| $\frac{6}{8}$ | $\frac{5}{8}$ | $\frac{4}{8}$ | $\frac{3}{8}$ |
| $\frac{7}{8}$ | $\frac{6}{8}$ | $\frac{5}{8}$ | $\frac{4}{8}$ |

TABLE 2-continued

Exemplary Weights for Opposite-Direction-Mode Interpolation

Mode 4 $w_4(y, x)$

| | | | |
|---|---|---|---|
| $\frac{7}{8}$ | $\frac{6}{8}$ | $\frac{5}{8}$ | $\frac{4}{8}$ |
| $\frac{6}{8}$ | $\frac{5}{8}$ | $\frac{4}{8}$ | $\frac{3}{8}$ |
| $\frac{5}{8}$ | $\frac{4}{8}$ | $\frac{3}{8}$ | $\frac{2}{8}$ |
| $\frac{4}{8}$ | $\frac{3}{8}$ | $\frac{2}{8}$ | $\frac{1}{8}$ |

Mode 13 $w_{13}(y, x)$

| | | | |
|---|---|---|---|
| $\frac{1}{8}$ | $\frac{2}{8}$ | $\frac{3}{8}$ | $\frac{4}{8}$ |
| $\frac{2}{8}$ | $\frac{3}{8}$ | $\frac{4}{8}$ | $\frac{5}{8}$ |
| $\frac{3}{8}$ | $\frac{4}{8}$ | $\frac{5}{8}$ | $\frac{6}{8}$ |
| $\frac{4}{8}$ | $\frac{5}{8}$ | $\frac{6}{8}$ | $\frac{7}{8}$ |

Mode 5 $w_5(y, x)$

| | | | |
|---|---|---|---|
| $\frac{10}{12}$ | $\frac{9}{12}$ | $\frac{8}{12}$ | $\frac{7}{12}$ |
| $\frac{8}{12}$ | $\frac{7}{12}$ | $\frac{6}{12}$ | $\frac{5}{12}$ |
| $\frac{6}{12}$ | $\frac{5}{12}$ | $\frac{4}{12}$ | $\frac{3}{12}$ |
| $\frac{4}{12}$ | $\frac{3}{12}$ | $\frac{2}{12}$ | $\frac{1}{12}$ |

Mode 14 $w_{14}(y, x)$

| | | | |
|---|---|---|---|
| $\frac{2}{12}$ | $\frac{3}{12}$ | $\frac{4}{12}$ | $\frac{5}{12}$ |
| $\frac{4}{12}$ | $\frac{5}{12}$ | $\frac{6}{12}$ | $\frac{7}{12}$ |
| $\frac{6}{12}$ | $\frac{7}{12}$ | $\frac{8}{12}$ | $\frac{9}{12}$ |
| $\frac{8}{12}$ | $\frac{9}{12}$ | $\frac{10}{12}$ | $\frac{11}{12}$ |

Mode 6 $w_6(y, x)$

| | | | |
|---|---|---|---|
| $\frac{10}{12}$ | $\frac{8}{12}$ | $\frac{6}{12}$ | $\frac{4}{12}$ |
| $\frac{9}{12}$ | $\frac{7}{12}$ | $\frac{5}{12}$ | $\frac{3}{12}$ |
| $\frac{8}{12}$ | $\frac{6}{12}$ | $\frac{4}{12}$ | $\frac{2}{12}$ |
| $\frac{7}{12}$ | $\frac{5}{12}$ | $\frac{3}{12}$ | $\frac{1}{12}$ |

Mode 15 $w_{15}(y, x)$

| | | | |
|---|---|---|---|
| $\frac{2}{12}$ | $\frac{4}{12}$ | $\frac{6}{12}$ | $\frac{8}{12}$ |
| $\frac{3}{12}$ | $\frac{5}{12}$ | $\frac{7}{12}$ | $\frac{9}{12}$ |
| $\frac{4}{12}$ | $\frac{6}{12}$ | $\frac{8}{12}$ | $\frac{10}{12}$ |
| $\frac{5}{12}$ | $\frac{7}{12}$ | $\frac{9}{12}$ | $\frac{11}{12}$ |

Mode 7 $w_7(y, x)$

| | | | |
|---|---|---|---|
| $\frac{7}{12}$ | $\frac{8}{12}$ | $\frac{9}{12}$ | $\frac{10}{12}$ |
| $\frac{5}{12}$ | $\frac{6}{12}$ | $\frac{7}{12}$ | $\frac{8}{12}$ |
| $\frac{3}{12}$ | $\frac{4}{12}$ | $\frac{5}{12}$ | $\frac{6}{12}$ |
| $\frac{1}{12}$ | $\frac{2}{12}$ | $\frac{3}{12}$ | $\frac{4}{12}$ |

Mode 16 $w_{16}(y, x)$

| | | | |
|---|---|---|---|
| $\frac{5}{12}$ | $\frac{4}{12}$ | $\frac{3}{12}$ | $\frac{2}{12}$ |
| $\frac{7}{12}$ | $\frac{6}{12}$ | $\frac{5}{12}$ | $\frac{4}{12}$ |
| $\frac{9}{12}$ | $\frac{8}{12}$ | $\frac{7}{12}$ | $\frac{6}{12}$ |
| $\frac{11}{12}$ | $\frac{10}{12}$ | $\frac{9}{12}$ | $\frac{8}{12}$ |

Mode 8 $w_8(y, x)$

| | | | |
|---|---|---|---|
| $\frac{7}{12}$ | $\frac{5}{12}$ | $\frac{3}{12}$ | $\frac{1}{12}$ |
| $\frac{8}{12}$ | $\frac{6}{12}$ | $\frac{4}{12}$ | $\frac{2}{12}$ |
| $\frac{9}{12}$ | $\frac{7}{12}$ | $\frac{5}{12}$ | $\frac{3}{12}$ |
| $\frac{10}{12}$ | $\frac{8}{12}$ | $\frac{6}{12}$ | $\frac{4}{12}$ |

Mode 17 $w_{17}(y, x)$

| | | | |
|---|---|---|---|
| $\frac{5}{12}$ | $\frac{7}{12}$ | $\frac{9}{12}$ | $\frac{11}{12}$ |
| $\frac{4}{12}$ | $\frac{6}{12}$ | $\frac{8}{12}$ | $\frac{10}{12}$ |
| $\frac{3}{12}$ | $\frac{5}{12}$ | $\frac{7}{12}$ | $\frac{9}{12}$ |
| $\frac{2}{12}$ | $\frac{4}{12}$ | $\frac{6}{12}$ | $\frac{8}{12}$ |

In some embodiments of the present invention, an encoder may perform RDO mode selection between the modified previously existing nine modes (mode 0-mode 8), the nine opposite directional modes (mode 9-mode 17) and the weighted interpolated modes.

In some embodiments, to save the overhead of mode signaling, nine modes may be used and weighted interpolated modes may be used when available.

In alternative embodiments of the present invention, the modified previously existing nine modes (mode 0-mode 8) and the nine opposite directional modes (mode 9-mode 17) may be used. One additional bit, also referred to as a flag, may be used to signal whether the mode is one of the previously existing nine modes or one of the opposite directional modes. In some embodiments of the present invention, the bit value, also referred to as the flag value, may not be signaled for every block. In these embodiments, the flag value may be predicted from the flag values of neighboring blocks within the currently processed plurality of blocks in the macroblock partition. In other embodiments, the flag value may be predicted from the flag values of neighboring blocks in pluralities of blocks that also use a flag value to signal alternative intra-prediction modes. By way of illustration, a first plurality of blocks within a macroblock may not use a flag value to signal alternative intra-prediction modes, while a second plurality of blocks within a macroblock may use a flag value to signal alternative intra-prediction modes. In alternative embodiments, the flag value may be predicted from the nearest block that uses a flag value. In yet alternative embodiments, the flag value may be predicted from the nearest block, in the horizontal direction, that uses a flag value and the nearest block, in the vertical direction, that uses a flag value. In still alternative embodiments, the flag value may be predicted using the nearest block in a neighboring macroblock that uses a flag value. In further alternative embodiments, the flag value may be predicted using the nearest block that uses a flag value in the macroblock that is the left neighbor of the current macroblock. In other embodiments, the flag value may be predicted using the nearest block in the macroblock that uses a flag value in the macroblock that is the upper neighbor of the current macroblock. In some embodiments of the present invention, the flag value may be predicted from the same blocks used for mode prediction. In some embodiments of the present invention, an encoder may signal whether or not a predicted flag value is correct or not. In some embodiments of the present invention, a decoder may decode information from a received bitstream as to whether or not a predicted flag value is correct or not.

In yet alternative embodiments of the present invention, the modified previously existing nine modes (mode 0-mode 8) and the weighted interpolated modes may be used. An additional bit, also referred to as a flag, may be used to signal whether the mode is one of the modified previously existing nine modes or one of the weighted interpolated modes. In some embodiments of the present invention, the bit value, also referred to as the flag value, may not be signaled for every block. In these embodiments, the flag value may be predicted from the flag values of neighboring blocks within the currently processed plurality of blocks in the macroblock partition. In other embodiments, the flag value may be predicted from the flag values of neighboring blocks in pluralities of blocks that also use a flag value to signal alternative intra-prediction modes. By way of illustration, a first plurality of blocks within a macroblock may not use a flag value to signal alternative intra-prediction modes, while a second plurality of blocks within a macroblock may use a flag value to signal alternative intra-prediction modes. In alternative embodiments, the flag value may be predicted from the nearest block that uses a flag value. In yet alternative embodiments, the flag value may be predicted from the nearest block, in the horizontal direction, that uses a flag value and the nearest block, in the vertical direction, that uses a flag value. In still alternative embodiments, the flag value may be predicted using the nearest block in a neighboring macroblock that uses a flag value. In further alternative embodiments, the flag value may be predicted using the nearest block that uses a flag value in the macroblock that is the left neighbor of the current macroblock. In other embodiments, the flag value may be predicted using the nearest block in the macroblock that uses a flag value in the macroblock that is the upper neighbor of the current macroblock. In some embodiments of the present invention, the flag value may be predicted from the same blocks used for mode prediction. In some embodiments of the present invention, an encoder may signal whether or not a predicted flag value is correct or not. In some embodiments of the present invention, a decoder may decode information from a received bitstream as to whether or not a predicted flag value is correct or not.

In yet alternative embodiments of the present invention, the opposite directional modes (mode 9-mode 17) and the weighted interpolated modes may be used. An additional bit, also referred to as a flag, may be used to signal whether the mode is one of the modified previously existing nine modes or one of the weighted interpolated modes. In some embodiments of the present invention, the bit value, also referred to as the flag value, may not be signaled for every block. In these embodiments, the bit value may be predicted from the bit values of neighboring blocks within the currently processed plurality of blocks in the macroblock partition. In other embodiments, the flag value may be predicted from the flag values of neighboring blocks in pluralities of blocks that also use a flag value to signal alternative intra-prediction modes. By way of illustration, a first plurality of blocks within a macroblock may not use a flag value to signal alternative intra-prediction modes, while a second plurality of blocks within a macroblock may use a flag value to signal alternative intra-prediction modes. In alternative embodiments, the flag value may be predicted from the nearest block that uses a flag value. In yet alternative embodiments, the flag value may be predicted from the nearest block, in the horizontal direction, that uses a flag value and the nearest block, in the vertical direction, that uses a flag value. In still alternative embodiments, the flag value may be predicted using the nearest block in a neighboring macroblock that uses a flag value. In further alternative embodiments, the flag value may be predicted using the nearest block that uses a flag value in the macroblock that is the left neighbor of the current macroblock. In other embodiments, the flag value may be predicted using the nearest block in the macroblock that uses a flag value in the macroblock that is the upper neighbor of the current macroblock. In some embodiments of the present invention, the flag value may be predicted from the same blocks used for mode prediction. In some embodiments of the present invention, an encoder may signal whether or not a predicted flag value is correct or not. In some embodiments of the present invention, a decoder may decode information from a received bitstream as to whether or not a predicted flag value is correct or not.

In yet alternative embodiments of the present invention, pixel values may be predicted using weighted interpolation of any two independent intra modes.

In some embodiments of the present invention a mode may be numbered between "0" and "8." In these embodiments, the mode prediction of the first set of intra blocks will not be affected by the mode numbering. Table 3 shows exemplary syntax for intra 4×4 prediction. The italicized text is a new addition, to the existing H.264/AVC syntax, in accordance with embodiments of the present invention.

TABLE 3

Example syntax table for parallel intra 4×4 prediction

| | C | Descriptor |
|---|---|---|
| mb__pred(mb__type) | | |
| .................. | | |
| if( MbPartPredMode( mb__type, 0 ) = = Intra__4×4) { | | |
| *MB__has__weighted__intra__block__flag* | 2 | u(1) \| ae(v) |
| for( luma4×4BlkIdx=0; luma4×4BlkIdx<16; luma4×4BlkIdx++ ) { | | |
| *If (!MB__has__weighted__intra__block__flag* \|\| *!weighted__intra__possible(luma4×4BlkIdx)*) { | | |
| prev__intra4×4__pred__mode__flag[ luma4×4BlkIdx ] | 2 | u(1) \| ae(v) |
| if( !prev__intra4×4__pred__mode__flag[ luma4×4BlkIdx ] ) | | |
| rem__intra4×4__pred__mode[ luma4×4BlkIdx ] | 2 | u(3) \| ae(v) |
| } else { | | |
| *intra4×4__pred__weighted__flag*[ *luma4×4BlkIdx* ] | 2 | u(1) \| ae(v) |
| prev__intra4×4__pred__mode__flag[ luma4×4BlkIdx ] | 2 | u(1) \| ae(v) |
| if( !prev__intra4×4__pred__mode__flag[ luma4×4BlkIdx ] ) | | |
| rem__intra4×4__pred__mode[ luma4×4BlkIdx ] | 2 | u(3) \| ae(v) |
| } | | |
| } | | |

The flag "MB_has_weighted_intra_block_flag" may specify whether any block in the Macroblock uses the weighted intra prediction mode. If "MB_has_weighted_intra_block_flag" is equal to 0, then no block in the Macroblock uses weighted intra prediction mode. If the flag "MB_has_weighted_intra_block_flag" is equal to 1, then the Macroblock contains at least one block that uses weighted intra prediction mode.

The flag "intra4×4_pred_weighted_flag" may specify whether an intra4×4 prediction mode is the weighted intra-prediction mode. This flag may only be present when "MB_has_weighted_intra_block_flag" is equal to 1 and the 4×4 block is in a position it which it is possible to have the weighted intra prediction mode. Blocks that can possibly have the weighted intra prediction mode may be blocks in the second set of blocks except block 15 which does not have right and bottom neighbors. If the flag "intra4×4_pred_weighted_flag" is equal to 0, then the intra-prediction mode of the block may be the original intra prediction mode which is predicted from upper and left neighbors. If the flag "intra4×4_pred_weighted_flag" is equal to 1, then the intra prediction mode of the block may be the weighted intra-prediction mode, which predicts the block values using a weighted combination between a prediction from the upper and left neighbors and a prediction from the bottom and right neighbors. In some embodiments of the present invention, the flag value may not be signaled for every block. In these embodiments, the flag value may be predicted from the flag values of neighboring blocks within the currently processed plurality of blocks in the macroblock partition. In other embodiments, the flag value may be predicted from the flag values of neighboring blocks in pluralities of blocks that also use a flag value to signal alternative intra-prediction modes. By way of illustration, a first plurality of blocks within a macroblock may not use a flag value to signal alternative intra-prediction modes, while a second plurality of blocks within a macroblock may use a flag value to signal alternative intra-prediction modes. In alternative embodiments, the flag value may be predicted from the nearest block that uses a flag value. In yet alternative embodiments, the flag value may be predicted from the nearest block, in the horizontal direction, that uses a flag value and the nearest block, in the vertical direction, that uses a flag value. In still alternative embodiments, the flag value may be predicted using the nearest block in a neighboring macroblock that uses a flag value. In further alternative embodiments, the flag value may be predicted using the nearest block that uses a flag value in the macroblock that is the left neighbor of the current macroblock. In other embodiments, the flag value may be predicted using the nearest block in the macroblock that uses a flag value in the macroblock that is the upper neighbor of the current macroblock. In some embodiments of the present invention, the flag value may be predicted from the same blocks used for mode prediction. In some embodiments of the present invention, an encoder may signal whether or not a predicted flag value is correct or not. In some embodiments of the present invention, a decoder may decode information from a received bitstream as to whether or not a predicted flag value is correct or not.

In some embodiments of the present invention, the intra-prediction mode, Intra4×4 PredMode[luma4×4BlkIdx], for a block may be derived according to the following pseudo code:

```
predIntra4x4PredMode = Min( intraMxMPredModeA,
intraMxMPredModeB )
if( prev_intra4x4_pred_mode_flag[ luma4x4BlkIdx ] )
  Intra4x4PredMode[ luma4x4BlkIdx ] = predIntra4x4PredMode
else
  if( rem_intra4x4_pred_mode[ luma4x4BlkIdx ]
  < predIntra4x4PredMode )
    Intra4x4PredMode[ luma4x4BlkIdx ] = rem_intra4x4_pred_mode[
luma4x4BlkIdx ]
else
    Intra4x4PredMode[ luma4x4BlkIdx ] = rem_intra4x4_pred_mode[
luma4x4BlkIdx ] + 1.
```

Where in the pseudo code, intraM×MPredModeA and Intra M×MPredModeB are the prediction modes of a first and a second neighboring block, for which the intra-prediction mode is available, and prev_intra4×4_pred_mode_flag [luma4×4BlkIdx] and rem_intra4×4_pred_mode[luma4×4BlkIdx] specify the Intra__4×4 prediction of the 4×4 luma block with index luma4×4BlkIdx=0, . . . , 15.

An available intra-prediction mode may refer to the intra-prediction mode for a block for which an intra-prediction mode has been determined. An available block may refer to a block for which an intra-prediction mode has been determined.

In some embodiments of the present invention, residual data of the first set of blocks and the second set of blocks may be signaled as specified in H.264/AVC and other video standards. In alternative embodiments of the present invention, the residual data may be signaled in block-coding order. For example, in some embodiments, the residuals of the first set of blocks may be sent in the bitstream first, and the residuals of the second set of blocks may be subsequently sent in the bitstream In some of these embodiments, the decoder may start reconstructing the first set of blocks immediately after entropy decoding the residual data. Some embodiments of the present invention may comprise a bit flag "parallelResidualSignaling" which may specify whether the residual data of the first set of blocks and the second set of intra 4×4 block are sent separately. The flag "If the flag "parallelResidualSignaling" is equal to 0, then the residual data of the Macroblock may be sent as one Macroblock as specified in H.264/AVC. If the flag "parallelResidualSignaling" is equal to 1, then the residual data of the first set of intra 4×4 blocks in a Macroblock may be sent first, and the residual data of the second set of parallel intra 4×4 blocks may be sent subsequently. Table 4 lists exemplary syntax comprising the flag "parallelResidualSignaling." The flag bit "parallelResidualSignaling" may be sent in the sequence parameter set in some embodiments of the present invention. In alternative embodiments, the flag bit "parallelResidualSignaling" may be sent in the picture parameter set.

TABLE 4

Example syntax table for parallel intra 4×4 prediction residual signaling

| | C | Descriptor |
|---|---|---|
| residual( ) { | | |
| ........ | | |
| if( MbPartPredMode( mb__type, 0 ) = = Intra__4×4 && parallelResidualSignaling ) { | | |
| for( 4×4 block in 1st set of blocks) { | | |
| residual__block( ) | | |
| } | | |
| for( 4×4 block in 2nd set of blocks) { | | |
| residual__block( ) | | |
| } | | |
| } | | |
| ...... | | |

In some embodiments of the present invention, the prediction modes for a plurality of blocks may be signaled interleaved with the block residuals. In alternative embodiments, the prediction modes may be signaled for all of the blocks within the plurality of blocks prior to the signaling of the residuals for the blocks within the plurality of blocks.

In some embodiments of the present invention, an encoder may determine a macroblock partition and signal the partition choice in a bitstream. In alternative embodiments, an encoder may use a default partition.

In some embodiments of the present invention, a decoder may decode, from a bitstream, information identifying a macroblock partition. In alternative embodiments, a partition may be determined at a decoder to be a default partition.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for intra prediction of a macroblock, said method comprising:

in a video device, predicting a plurality of pixel values in a first block of a macroblock, wherein:

said macroblock is partitioned into a first plurality of blocks and a second plurality of blocks, wherein said first plurality of blocks comprises at least two blocks and said second plurality of blocks comprises at least two blocks;

when said first block is any block in said first plurality of blocks, said predicting said plurality of pixel values uses reconstructed pixel values from only neighboring macroblocks to said macroblock; and when said first block is any block in said second plurality of blocks, said predicting said plurality of pixel values uses reconstructed pixel values from only said neighboring macroblocks to said macroblock and any of said blocks in said first plurality of blocks.

2. A method as described in claim 1, wherein said video device is a device selected from a group consisting of a video encoder, a video decoder and a video transcoder.

3. A method as described in claim 1, wherein said first plurality of blocks and said second plurality of blocks form a checker-board pattern relative to each other.

4. A method as described in claim 1, wherein each block in said second plurality of blocks has a first neighboring block in said first plurality of blocks.

5. A method as described in claim 1 further comprising determining said partition.

6. A method as described in claim 5, wherein said determining said partition comprises decoding information from a bitstream.

7. A method as described in claim 1, wherein when said first block is in a third plurality of blocks in said partition of said macroblock, said predicting said plurality of pixel values uses reconstructed pixel values from only said first plurality of blocks, said second plurality of blocks and said neighboring macroblocks to said macroblock.

8. A method as described in claim 1 further comprising:

determining a first residual associated with said first block; and encoding said first residual in a bitstream.

9. A method as described in claim 1 further comprising:

decoding a first residual associated with said first block; and combining said first residual with said plurality of predicted pixel values.

10. A method for intra prediction of a macroblock, said method comprising:

in a video device, predicting a first plurality of blocks in a macroblock using reconstructed pixel values from only reconstructed macroblocks; and in said video device, predicting, subsequent to said predicting said first plurality of blocks, a second plurality of blocks in said macroblock using reconstructed blocks only from said reconstructed macroblocks and any blocks in said first plurality of blocks, wherein said first plurality of blocks comprises at least two blocks and said second plurality of blocks comprises at least two blocks.

11. A method as described in claim 10, wherein said video device is a device selected from a group consisting of a video encoder, a video decoder and a video transcoder.

12. A method as described in claim 10, wherein said first plurality of blocks and said second plurality of blocks form a checker-board pattern relative to each other.

13. A method as described in claim 10, wherein each block in said second plurality of blocks has a first neighboring block in said first plurality of blocks.

14. A method as described in claim 10 further comprising predicting, subsequent to said predicting said first plurality of blocks and said predicting said second plurality of blocks, a third plurality of blocks in said macroblock using reconstructed blocks only from said first plurality of blocks, said second plurality of blocks and said reconstructed macroblocks.

15. A method as described in claim 14 further comprising decoding information from a bitstream to determine a partition of said macroblock, wherein said partition identifies said first plurality of blocks, said second plurality of blocks and said third plurality of blocks.

16. A method as described in said claim 10, wherein said reconstructed macroblocks are neighboring macroblocks to said macroblock.

17. A method as described in claim 10 further comprising partitioning said macroblock into said first plurality of blocks and said second plurality of blocks.

18. A method as described in claim 17, wherein said partitioning comprises decoding information from a bitstream to determine said first plurality of blocks and said second plurality of blocks.

19. A non-transitory computer-readable medium encoded with a computer program processable by a computing system for causing said computing system to execute a method comprising:

predicting a first plurality of blocks in a macroblock using reconstructed pixel values from only reconstructed macroblocks; and predicting, subsequent to said predicting said first plurality of blocks, a second plurality of blocks in said macroblock using only reconstructed blocks only from said reconstructed macroblocks and any blocks in said first plurality of blocks, wherein said first plurality of blocks comprises at least two blocks and said second plurality of blocks comprises at least two blocks.

20. A non-transitory computer-readable medium as described in claim 19, wherein said method further comprises partitioning said macroblock into said first plurality of blocks and said second plurality of blocks.

21. A non-transitory computer-readable medium as described in claim 20, wherein said partitioning comprises decoding a bitstream to determine said first plurality of blocks and said second plurality of blocks.

22. A non-transitory computer-readable medium as described in claim 19, wherein said method further comprises predicting, subsequent to said predicting said first plurality of blocks and said predicting said second plurality of blocks, a third plurality of blocks in said macroblock using reconstructed blocks only from said first plurality of blocks, said second plurality of blocks and said reconstructed macroblocks.

23. A non-transitory computer-readable medium as described in claim 22, wherein said method further comprises partitioning said macroblock into said first plurality of blocks, said second plurality of blocks and said third plurality of blocks.

24. A non-transitory computer-readable medium as described in claim 19, wherein said first plurality of blocks and said second plurality of blocks form a checker-board pattern relative to each other.

25. A non-transitory computer-readable medium as described in claim 19, wherein each block in said second plurality of blocks has a first neighboring block in said first plurality of blocks.

26. A non-transitory computer-readable medium as described in said claim 19, wherein said reconstructed macroblocks are neighboring macroblocks to said macroblock.

27. A non-transitory computer-readable medium as described in claim 19, wherein said computing system is part of a device selected from a group consisting of a video encoder, a video decoder and a video transcoder.

* * * * *